(12) United States Patent
Lumbard

(10) Patent No.: US 10,079,923 B2
(45) Date of Patent: *Sep. 18, 2018

(54) FOLDABLE ELECTRONIC GAMING OR MOBILE COMMUNICATION DEVICE FOR INSERTION INTO HIP POCKET

(71) Applicant: John Ashmore Lumbard, Hollis, NH (US)

(72) Inventor: John Ashmore Lumbard, Hollis, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,644

(22) Filed: Apr. 28, 2017

(65) Prior Publication Data

US 2017/0251087 A1    Aug. 31, 2017

Related U.S. Application Data

(63) Continuation of application No. PCT/US2017/012316, filed on Jan. 5, 2017, which is
(Continued)

(51) Int. Cl.
*H04M 1/02* (2006.01)
*H04B 1/3888* (2015.01)
*G06F 1/16* (2006.01)

(52) U.S. Cl.
CPC .......... *H04M 1/0279* (2013.01); *G06F 1/165* (2013.01); *H04B 1/3888* (2013.01);
(Continued)

(58) Field of Classification Search
CPC ........................... H04M 1/0279; H04B 1/3888
(Continued)

(56) References Cited

U.S. PATENT DOCUMENTS 3,400,226 A   9/1968  Krumreich et al.
5,259,019 A  11/1993  Stilley
(Continued)

FOREIGN PATENT DOCUMENTS

CN    202713288 U    1/2013
EP    1 274 216 B1   8/2006
(Continued)

OTHER PUBLICATIONS

International Search Report Corresponding to PCT/US2017/012316 dated Apr. 20, 2017.
(Continued)

*Primary Examiner* — Ayodeji Ayotunde
(74) *Attorney, Agent, or Firm* — Davis & Bujold PLLC; Michael J. Bujold

(57) ABSTRACT

A mobile communication device which comprises a first member with first surface having a first curvature and a second surface having a second curvature; a second member having first surface with a third curvature and a second surface with a fourth curvature. A hinge pivotally connects the first and second members with one another such that they are movable between opened and closed configurations. The first and the second curvatures of the first member combine with one another and form a combined average curvature for the first member and the third and the fourth curvatures of the second member combine combine with one another and form a combined average curvature for the second member. The combined average curvature for the first member and the combined average curvature for the second member combine with one another to form a combined average curvature for the communication device which is 8 feet or less.

19 Claims, 14 Drawing Sheets

Related U.S. Application Data a continuation-in-part of application No. 14/988,198, filed on Jan. 5, 2016, now Pat. No. 9,560,179, which is a continuation-in-part of application No. 14/143,117, filed on Dec. 30, 2013, now Pat. No. 9,591,114, which is a continuation-in-part of application No. 13/858,344, filed on Jul. 5, 2013.

(52) U.S. Cl.
 CPC ......... *H04M 1/0216* (2013.01); *G06F 1/1616* (2013.01); *G06F 1/1656* (2013.01)

(58) Field of Classification Search
 USPC ................ 455/90.3, 575.1, 575.3, 575.8
 See application file for complete search history.

(56) References Cited

U.S. PATENT DOCUMENTS

| | | |
|---|---|---|
| 5,838,789 A * | 11/1998 | Mendolia ............ H01Q 1/245 379/433.01 |
| 6,470,175 B1 | 10/2002 | Park et al. |
| 6,708,046 B1 | 3/2004 | Takagi |
| 6,738,111 B2 | 5/2004 | Kawata |
| 6,961,593 B1 | 11/2005 | Lonka et al. |
| 7,290,718 B2 | 11/2007 | Sekita |
| 7,439,928 B2 | 10/2008 | Forster et al. |
| 7,469,156 B2 | 12/2008 | Kota et al. |
| 7,640,043 B2 | 12/2009 | Komiyama |
| 7,885,695 B2 | 2/2011 | Kauhaniemi et al. |
| 8,106,407 B2 | 1/2012 | Yamazaki et al. |
| 8,108,018 B2 | 1/2012 | Jung |
| 8,150,480 B2 | 4/2012 | Johansson |
| 8,150,482 B2 | 4/2012 | Matsuoka |
| 8,462,289 B2 | 6/2013 | Nishizawa et al. |
| 8,467,172 B2 | 6/2013 | Sugimori et al. |
| 8,478,369 B2 | 7/2013 | Ogatsu |
| 8,497,516 B2 | 7/2013 | Yamazaki et al. |
| 8,634,885 B2 | 1/2014 | Chang et al. |
| 8,735,899 B2 | 5/2014 | Yamazaki et al. |
| 9,001,010 B2 | 4/2015 | Jeon |
| 9,113,553 B2 | 8/2015 | An et al. |
| 9,560,179 B2 * | 1/2017 | Lumbard ............ H04M 1/0279 |
| 9,591,114 B2 | 3/2017 | Lumbard |
| 2002/0006809 A1 | 1/2002 | Kubo et al. |
| 2002/0027636 A1 | 3/2002 | Yamada |
| 2004/0157653 A1 | 8/2004 | Kato |
| 2004/0212956 A1 | 10/2004 | Kuivas et al. |
| 2006/0205450 A1 | 9/2006 | Amano et al. |
| 2006/0273304 A1 | 12/2006 | Cok |
| 2007/0049068 A1 | 3/2007 | Yanagida |
| 2008/0139257 A1 | 6/2008 | Dai et al. |
| 2008/0232048 A1 * | 9/2008 | Yamamoto .......... H04M 1/0247 361/679.07 |
| 2009/0042610 A1 | 2/2009 | Kota et al. |
| 2009/0122015 A1 | 5/2009 | Demuynck |
| 2009/0174666 A1 | 7/2009 | Matsuoka |
| 2009/0176542 A1 | 7/2009 | Matsuoka |
| 2009/0318203 A1 | 12/2009 | Anand et al. |
| 2011/0105204 A1 | 5/2011 | Kouno |
| 2012/0001822 A1 | 1/2012 | Liu et al. |
| 2012/0151760 A1 | 6/2012 | Steijner |
| 2012/0162049 A1 | 6/2012 | Aoki et al. |
| 2013/0012264 A1 | 1/2013 | Mitsunaga |
| 2013/0215011 A1 | 8/2013 | Ke |
| 2013/0278873 A1 | 10/2013 | Enomoto |
| 2015/0011272 A1 | 1/2015 | Lumbard |

FOREIGN PATENT DOCUMENTS

| | | |
|---|---|---|
| EP | 2 381 654 A1 | 10/2011 |
| JP | 2006165805 A | 6/2006 |

OTHER PUBLICATIONS

Written Opinion Corresponding to PCT/US2017/012316 dated Apr. 20, 2017.
Australian Examination Report issued in corresponding Australian Patent Application No. 2014284290 dated Jun. 7, 2017.
European Search Report issued in corresponding European Patent Application No. 14819646.2 dated May 15, 2017.
LG G Flex: Curved Phone with Ergonomic Design, http://www.lg.com/us/mobile-phones/gflex/design.jsp—At least as early as Nov. 30, 2013.
Samsung's New Curvy, Sexy Cell Phone! It Rocks! Literally!, PerezHilton.com, http://perezhilton.com/2013-10-09-samsung-debuts-new-curved-cell-phone-galaxy-round-mobile—Oct. 9, 2013.
Doug Aamoth, "New Google Phone Has Curved Screen, Latest Android Version", Time.com, http://techland.time.com/2010/12/06/new-google-phone-has-curved-screen-latest-android-version, Dec. 6, 2010.
Matt Brian, "LG confirms production of 'bendable and unbreakable' smartphone displays", www.engadget.com/2013/10/07/lg-curved-smartphone-display-production, Oct. 7, 2013.
Darren Murph, "Samsung showcases 4.5-inch flexible AMOLED, may actually mass produce this one", www.engadget.com/2010/11/04/samsung-showcases-4-5-inch-flexible-amoled-may-actually-mass-pr/, Nov. 4, 2010.

* cited by examiner

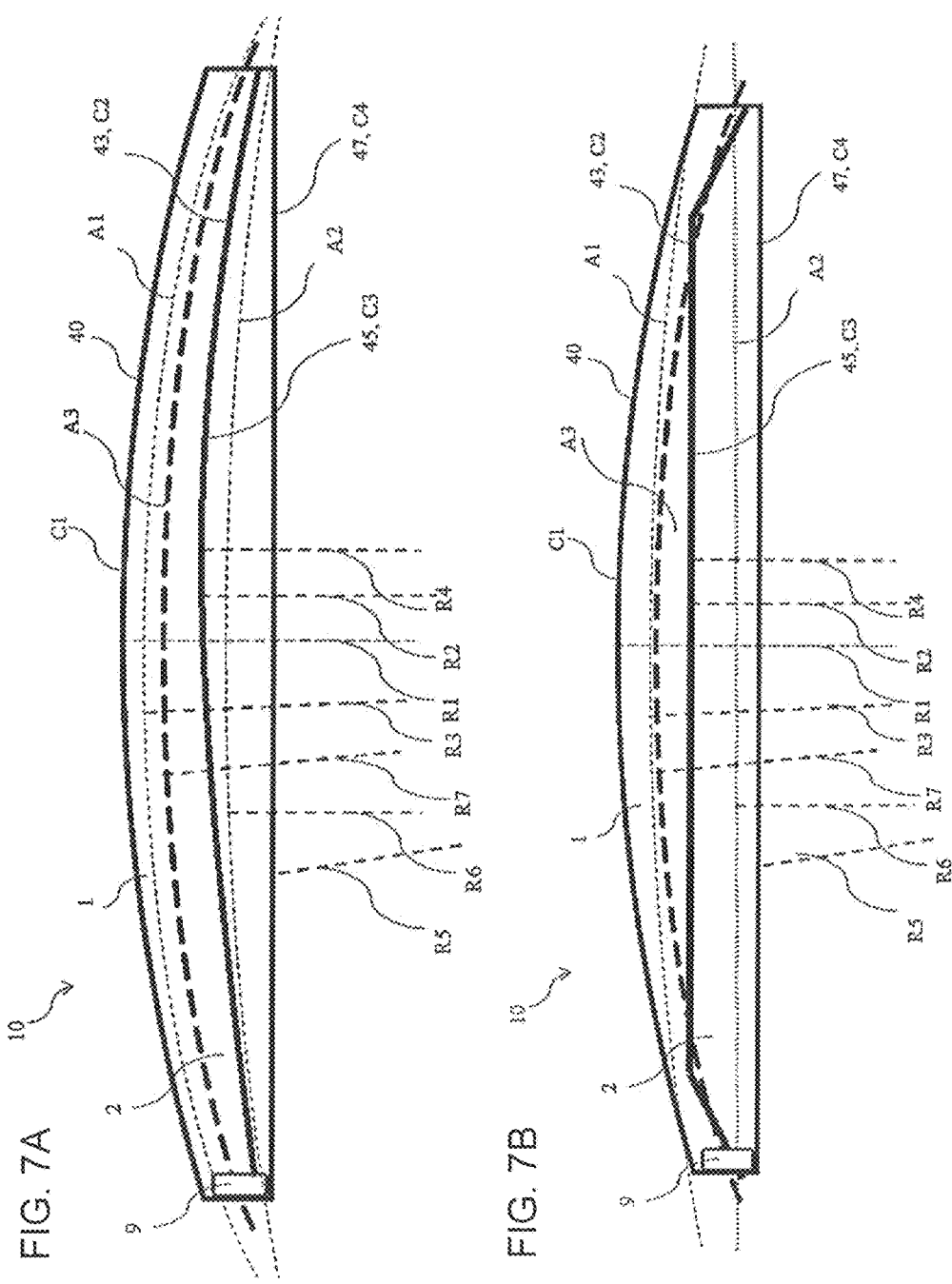

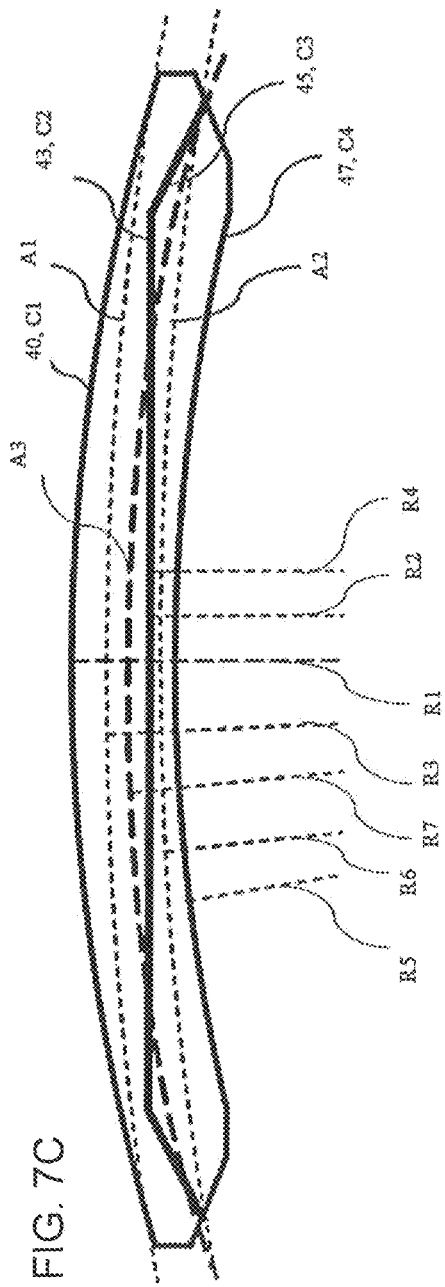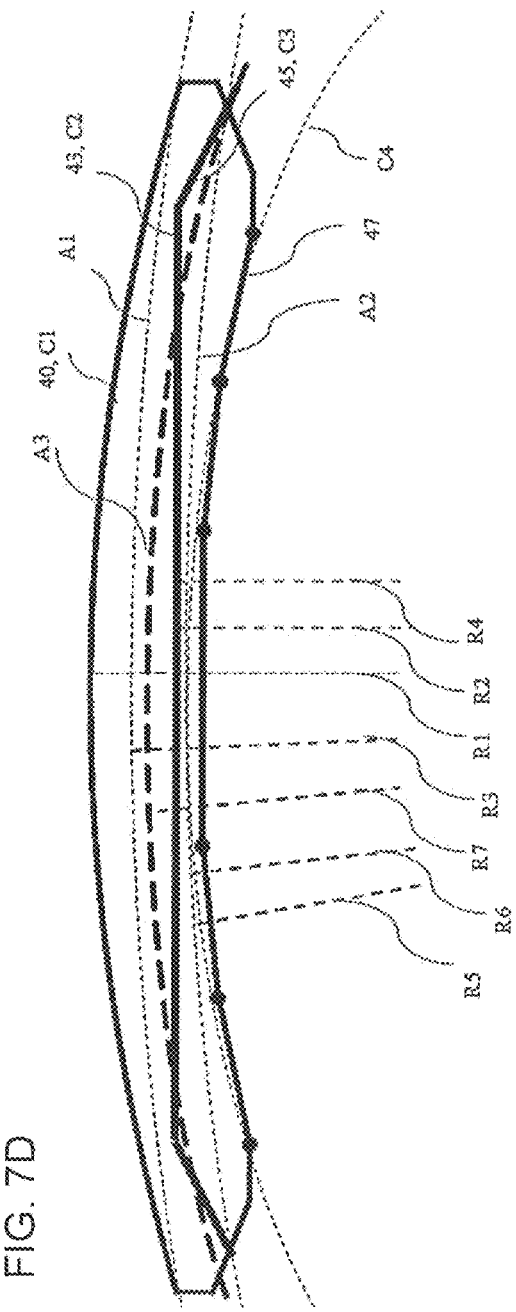

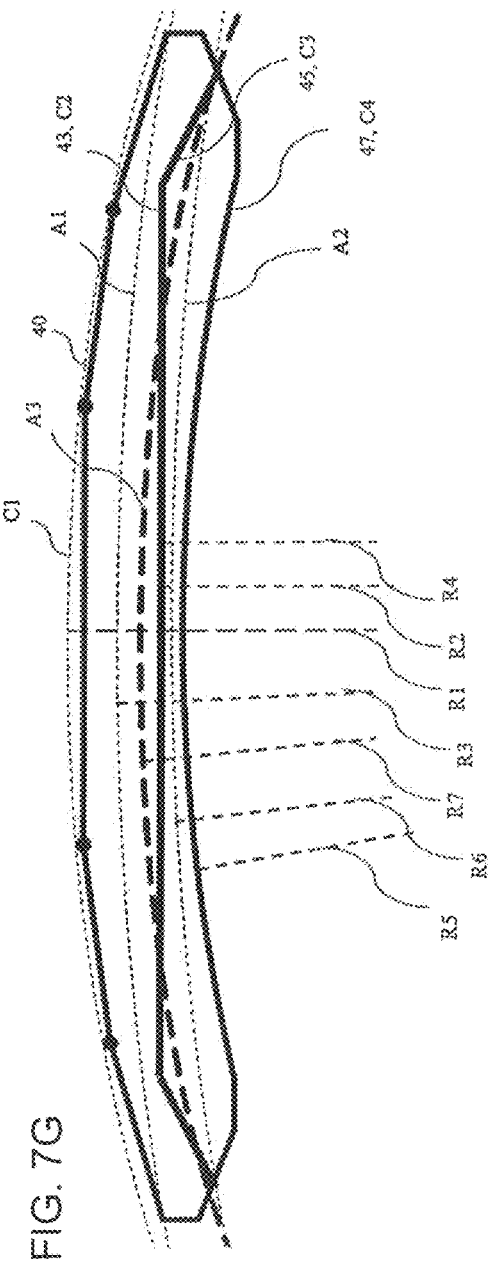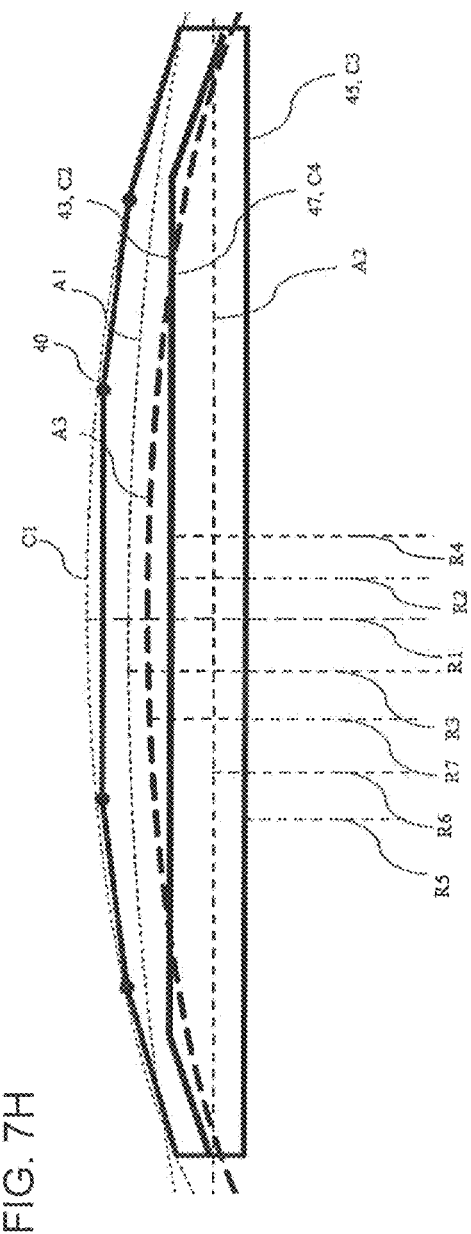

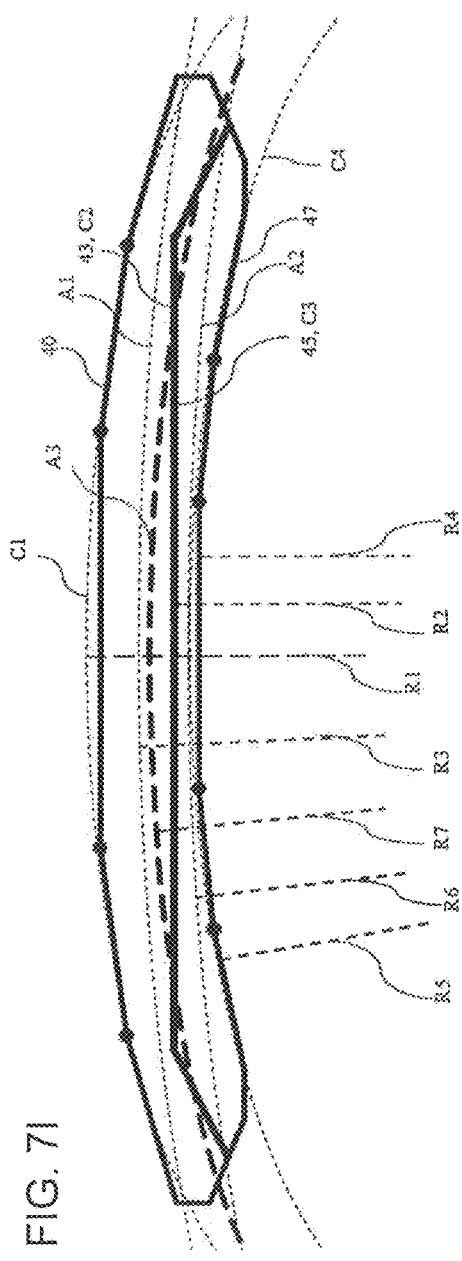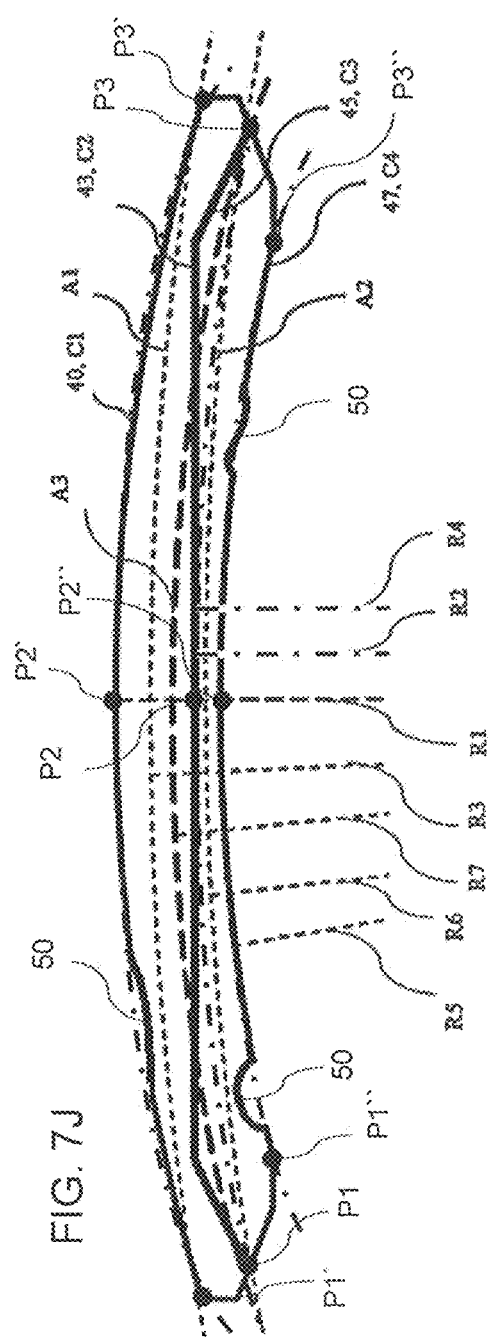

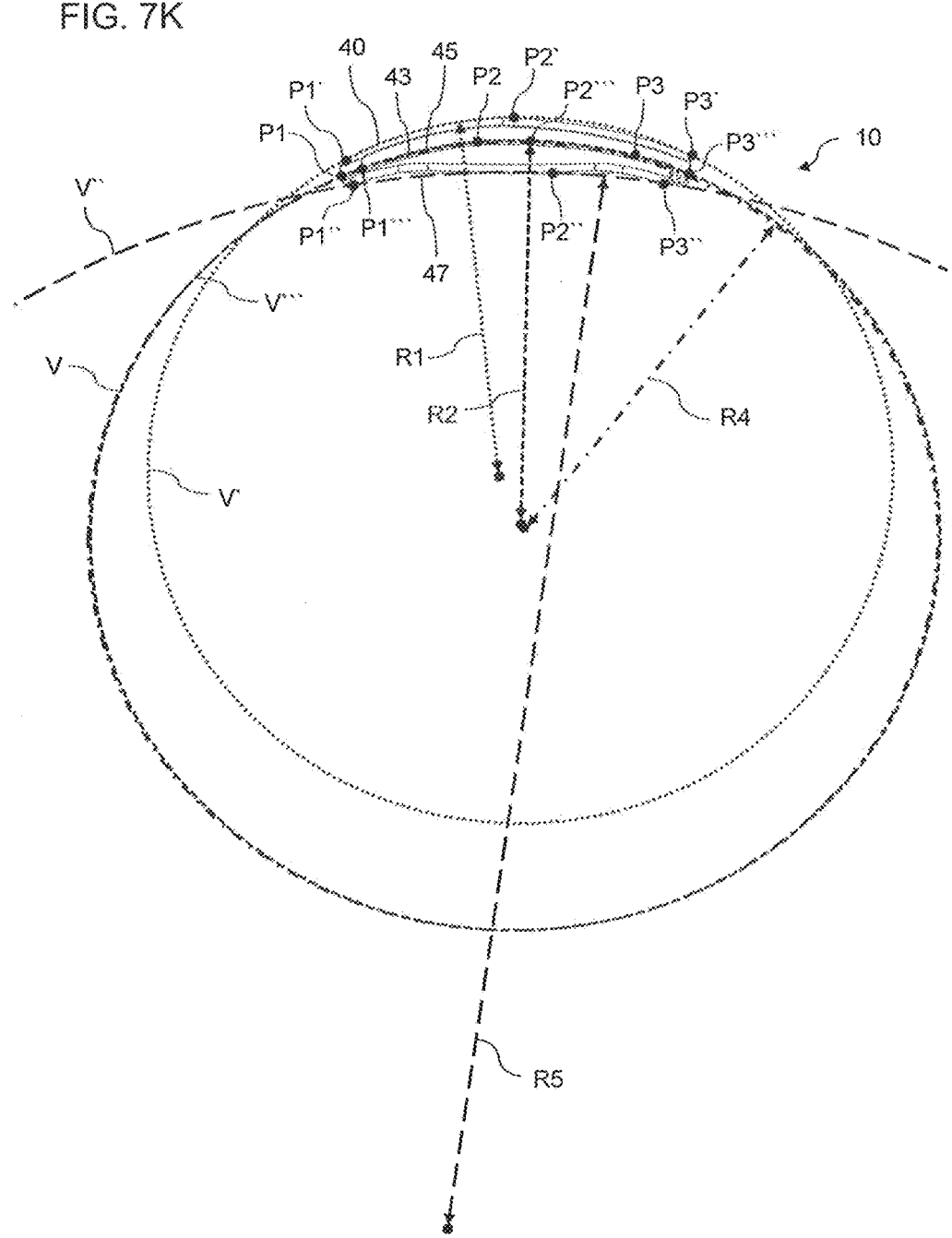

FOLDABLE ELECTRONIC GAMING OR MOBILE COMMUNICATION DEVICE FOR INSERTION INTO HIP POCKET

CROSS-REFERENCE TO RELATED APPLICATIONS

This application is a continuation of United States International Application No. PCT/US2017/012316 filed Jan. 5, 2017, which claims priority from U.S. Non-Provisional application Ser. No. 14/988,198 filed Jan. 5, 2016, which is continuation-in-part of U.S. Non-Provisional application Ser. No. 14/143,117 filed Dec. 30, 2013 which is a continuation-in-part of U.S. Non-Provisional application Ser. No. 13/858,344 filed Jul. 5, 2013, and the entire disclosure of each one of these applications is hereby incorporated herein by reference.

FIELD OF THE INVENTION

This invention relates to a foldable curved device for insertion into hip pocket. More particularly a clam-shell curved wireless mobile device shaped for insertion into a hip pocket in which a radius of curvature for the communication device is 8 feet or less.

BACKGROUND OF THE INVENTION

A mobile communication device, such as a "flip phone" or "clamshell" type handheld mobile communication device is generally known in the art. Such device typically comprises a first body member and a second body member which are pivotably coupled or connected together along a first edge by a conventional hinge or linkage mechanism such that the first member can be rotated with respect to the second member, between a stored "closed" position or configuration and an in-use "opened" position or configuration. The first body member is typically referred to as a lid member while the second member is commonly referred to as a base member.

The lid member commonly includes a graphical display while the base member typically includes a keyboard or some other alphanumeric input device. The graphical display and keyboard are typically located on the inwardly facing surfaces of the respective members. In the closed configuration, the inwardly facing surfaces of the lid and base members face one another and thus are not generally accessible by a user of the mobile communication device. In the opened configuration, however, the inwardly facing surfaces of the lid and base members generally form an angle of between about 120 and 180 degrees with respect to one another and are thus accessible/visible by the user of the mobile communication device to facilitate use thereof.

It is to be appreciated that for a mobile communication device, such as a flip phone device, it may be desirable for one or more input buttons or displays to be accessible when the mobile communication device is in the closed configuration. For example, a user of the mobile communication device may desire to check the status of the device, control media, silence a ringer, play a game, use an integrated camera, or send or receive other information while the mobile communication device is in the closed configuration. Therefore, the mobile communication device may further include one or more interface elements, such as an exterior touch screen, on an interface surface which is located on an exposed outwardly facing surface or along an perimeter edge of the mobile communication device in order to be accessible when the flip phone is in a closed configuration.

In a conventional mobile communication device, any interface element(s) on an outer surface of the device may not be easily accessible when the mobile communication device is in the opened configuration. For example, when the mobile communication device is in the opened configuration, the outer surface with the interface elements may not be facing in the same direction as the inwardly facing surfaces which supports the graphic display and/or the keyboard, for example. Accordingly, such interface element(s) may also be partially or completely hidden by the lid and/or the base members when the mobile communication device is in the opened configuration. Therefore, a conventional approach to allow access to interface elements, when the mobile communication device is in the opened configuration, is to duplicate one or more of these interface element(s), e.g., to locate such interface element(s) both an outwardly as well as an inwardly facing surface of the mobile communication device. However, this, in turn, leads to increase cost, size and/or complexity for the mobile communication device.

Mobile communication devices have always involved compromises, which mostly result from a desire to produce complicated devices with many gadgets and features that fit into a relatively small package for easy transport. The advent of touchscreen smartphones has exacerbated the problem because consumers want phones with large screen displays. This conflict was recently illustrated in North America, where mobile phone leaders, opted to roll out LTE offerings in the 700 MHZ frequency band. Such frequency bands (Band 17, 704-746 MHZ and Band 13, 746-786 MHZ) are lower than the legacy cellular frequency band used in North America (Band 5, 824-894 MHZ). However, the consumer demand for smaller, pocket-friendly devices has reduced the available antenna length and overall volume or interior space for the current designs of the mobile communication devices. Reducing the length of the antenna correspondingly tends to reduce the antenna bandwidth and overall efficiency. This reduction of length of the antenna length causes significant controversial compromises because lower frequencies have longer wavelengths and, therefore, typically require longer antennas in order to maintain radiation efficiency.

SUMMARY OF THE INVENTION

Despite the wide variety of mobile phones/communication devices available on the market today, there still remains a need for a communication device which not only incorporates the newest features but does so in a consumer friendly, easily transportable, and comfortable manner. Mobile communication devices are an essential aspect of the average consumer's lifestyle and as such, are carried wherever the consumer goes. However, in order to leave their hands free, many consumers carry their communication devices in their hip pockets despite an awkward fit and discomfort. To compensate for such discomfort, some users only partially insert their communication devices into their hip pockets, which then have a tendency to fall out and thereby create a risk of serious damage.

One of the main objects of the present invention is to provide a design, for a mobile communications device, that fits easily and comfortably in a hip pocket of a owner/user, similar to the fit achieved by a "broken-in" wallet. An embodiment of this invention is a rigid communication device which has a generally curved body, when in its closed configuration, which easily and comfortably slides and fits into a rear hip pocket of a mobile communication device owner/end-user without any significant discomfort.

Another object of the present invention is to provide an accessory that is much thicker than today's wireless devices and offers increased surface area, when in the opened configuration.

Yet another object of the present invention is to provide an accessory that can offer an antenna which has an increased transmission/reception length, when the communication device is in the open configuration, which can accommodate lower frequencies which have longer wavelengths and thereby maintain radiation efficiency for the communication device.

According to one embodiment of the invention, the mobile communication device comprises a full QWERTY keyboard; a display screen; a removable battery; antennae; and at least one speaker. The preferred embodiment includes all of these components enclosed within a rugged clamshell case that is designed to absorb the shock of an inadvertent fall without "spiderweb" damage to the display that commonly occurs with the display screens of currently available smartphones and/or damage to the internal electronic components.

According to a preferred embodiment, two display screens are provided, e.g., two large touchscreens or one large touchscreen and a smaller screen, adjacent to a physical keyboard. The smaller screen could be a touchscreen or an electronic-paper screen, which generally consumes very little power and would allow the user to extend battery life by turning off the large display and only using the small display for messaging, for example. The battery source is larger than that found in today's smartphones, and it can be removed and replaced with charged spare batteries—thus allowing a user to travel for several days without recharging. Inclusion of a kinetic-energy charger within the large interior of member 2 would allow a user to travel for weeks without recharging.

In a preferred form of the invention, the mobile communication device has 700 MHz-band antennae of greater length than has been previously provided for in prior art smartphones/communication devices, which provide better reception and improved transmission/reception sound quality.

Finally, a preferred embodiment utilizes a display screen with a curved glass surface in order to increase the average radius of curvature of the device. It is now possible to manufacture curved touchscreen glass, thus allowing devices that precisely conform to the consumer's body.

The wallet-like form factor allows significant thickness, relative to current designs, and a much-greater surface area for screens and for a full-featured keypad. The additional volume of the mobile communication device can be used to accommodate a larger, removable battery, better speakers, more-efficient antennae, and other features.

The old-fashioned telephone handset is still the gold standard for comfortable handheld conversation. A carefully-shaped folding hip phone can offer a comparable level of privacy and sound quality, and end the practice of shouting into the air while talking. This design, according to the present invention, absorbs the sound of the user's voice into the keyboard, and reflects it back toward his or her face. The curve in the screen also prevents contact between the consumer's face and the display, thus avoiding smudging of the screen.

The mobile communication device can be carried in a shirt pocket, either for use in speaker phone mode or for listening to music with the built-in MP3 player.

Closing the clamshell, after completion of a call, terminates the phone connection and turns off power to the display with certainty and finality that is not found in today's smart phones. The latter typically require two steps to complete the same action, and are thus responsible for a lot of unintended dialing.

When closed, the clamshell design will protect the two displays from scratches and the "spider web" cracking that has become all too common. The displays are mounted on curved-but-rigid sheets of carbon fiber or some other strong, lightweight, and rigid and durable material; the exterior shell of the phone is rigid and padded at the crown and hinges, but flexible enough at the edges to absorb a drop from chest level—regardless of orientation of the mobile communication device upon landing.

BRIEF DESCRIPTION OF THE DRAWINGS

The present invention will be understood by reference to the following detailed description, which should be read in conjunction with the appended drawings. It is to be appreciated that the following detailed description of various embodiments is by way of example only and is not meant to limit, in any way, the scope of the present invention.

FIGS. 7A, 7B, 7C, 7D, 7E, 7F. 7G, 7H, 7I, and 7J are diagrammatic side elevational views of various embodiments of the mobile communication device, according to the present invention, which are each shown in a closed configuration so as to illustrate the combined radius of curvature for the first and the second members and the combined radius of curvature for the communication device.

FIG. 7K is a diagrammatic side elevational view of an embodiment of the mobile communication device which illustrates the virtual circles which are coincident with the curvatures of the first and the second members of the communication device.

DETAILED DESCRIPTION OF THE PREFERRED EMBODIMENTS

Figure 1:
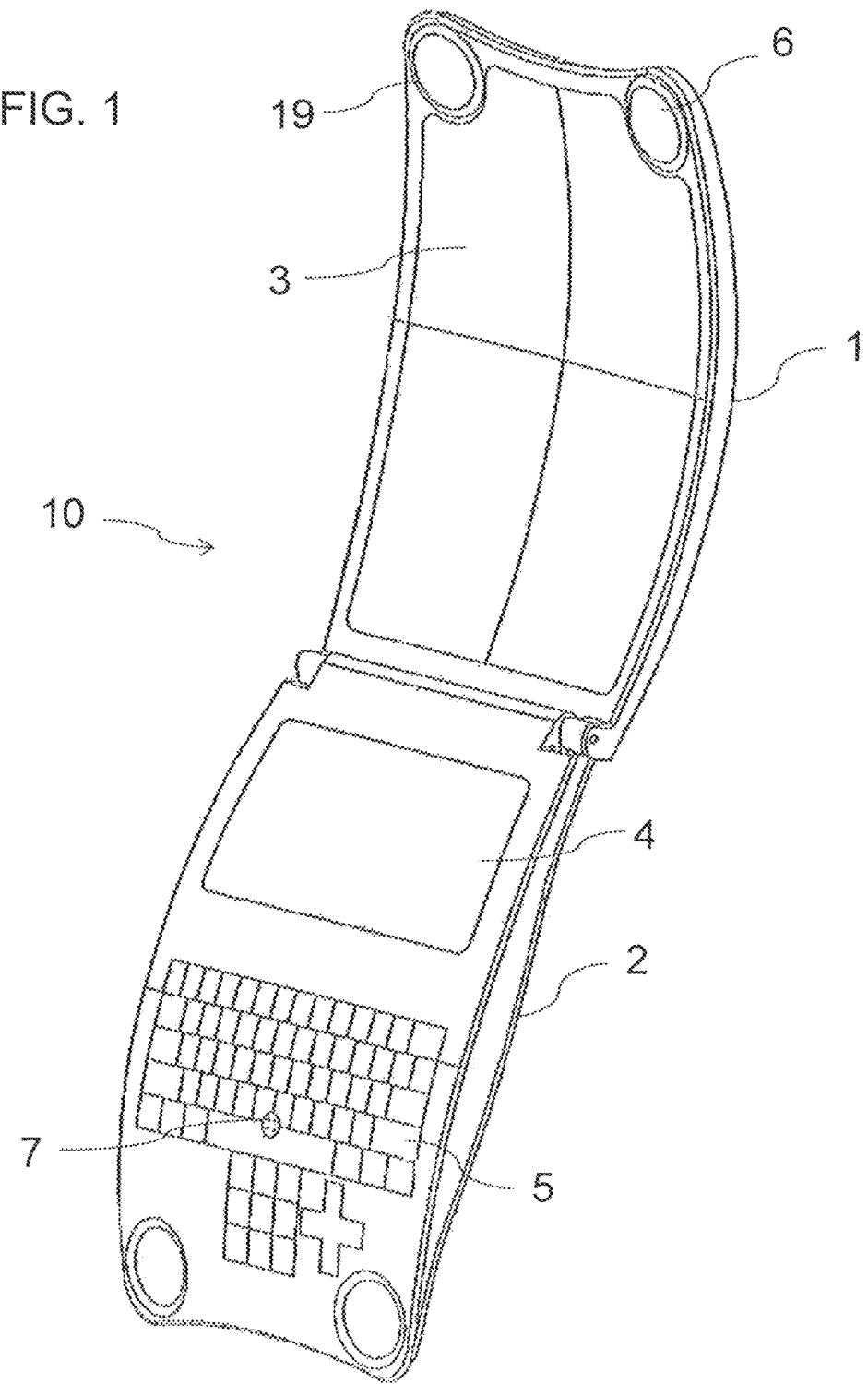
FIG. 1 is a diagrammatic front perspective view of the mobile communication device which comprises first and second members shown in an opened configuration.

FIG. 1 illustrates an embodiment of the invention in an open configuration, with the first member 1 pivoted or rotated up to 360 degrees with respect to the second member 2, about the hinge, into the opened configuration. The large touchscreen or other display screen 3 of the first member 1 is backed by a curved sheet of strong and rigid material, such as carbon fiber. In this embodiment, a large touchscreen or a smaller electronic-paper screen or touchscreen 4 is also provided on the second member 2 so that, when utilized as an applications device, the consumer will be able to type messages while viewing a document online. To facilitate use of the device with a smaller electronic—paper screen or touchscreen, this embodiment provides a full QWERTY keyboard 5, located below the smaller screen 4.

This opened configuration is also for utilization as a mobile communication device. When speaking, the consumer typically places his or her ear against the earphone 6 which protrudes from an upper corner of the inner surface of the first member, for example, as shown in FIG. 1, and speaks into a first microphone 7 located near the central portion of the inner surface of the second member 2. This embodiment provides several advantages over the prior art. First, the curve of the display screen will generally keep the display screen 3 free of the smudging that is common to most of today's devices. Second, due to the average curvature of the first and the second members 1, 2, as discussed below in further detail, the consumer is provided with increased privacy, in a manner similar to that achieved by the older telephone handset. This arrangement assists with providing more secure and private conversation, particularly in restaurants, on airplanes, and/or in other public locations. That is, the communication device 10, according to the present invention, makes it much easier to hear the conversation, via the earpiece 6, as well as facilitate reception of the sound emitted toward the first microphone 7. The first member also supports a conventional "selfie" camera 19.

Again, most consumers typically carry his/her communication device 10 in a hip pocket despite any awkwardness and/or discomfort that results from trying to fit a cuboid—shaped item into a hemispherical pocket with a crescent shaped mouth, for example. As shown in FIG. 1, a curved and rigid screen 3 can be sufficiently protected by a folding device that has flexible edges for comfort and ruggedness while still providing a greater curvature which is typically necessary for ease of transport via a hip pocket. The embodiment of FIG. 1 offers a large screen, comparable to those in today's most-popular smart phones, as well as a smaller touchscreen or electronic-paper screen 4, located above the keyboard 5, which can be used to generate e-mails and text messages without an excessive drain of battery power. Alternately both screens can be used at the same time to review a document or a web page while also generating an email or a text message.

Figure 2:
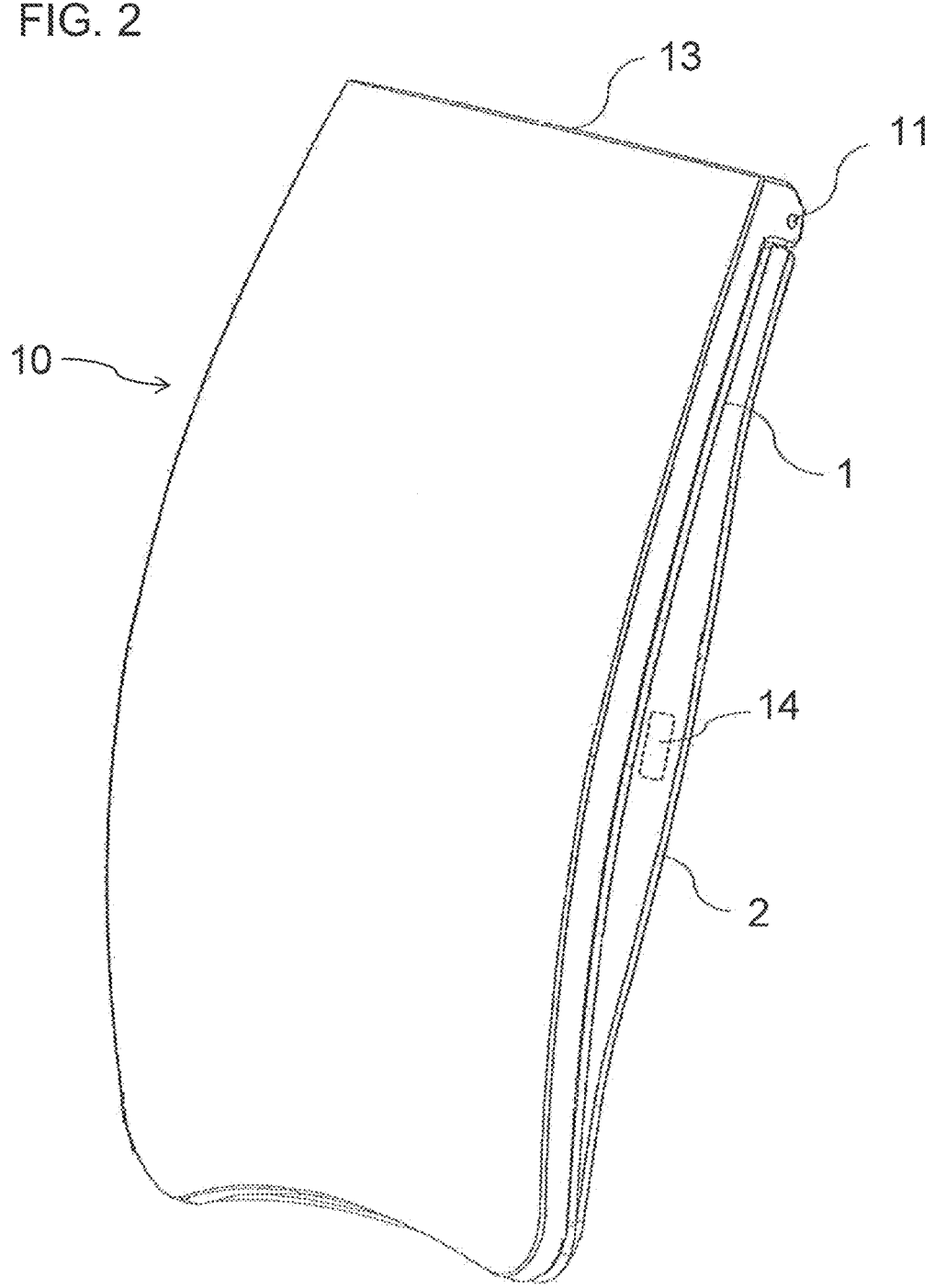
FIG. 2 is a diagrammatic front perspective view of the mobile communication device of FIG. 1, shown in a closed configuration.
Figure 3:
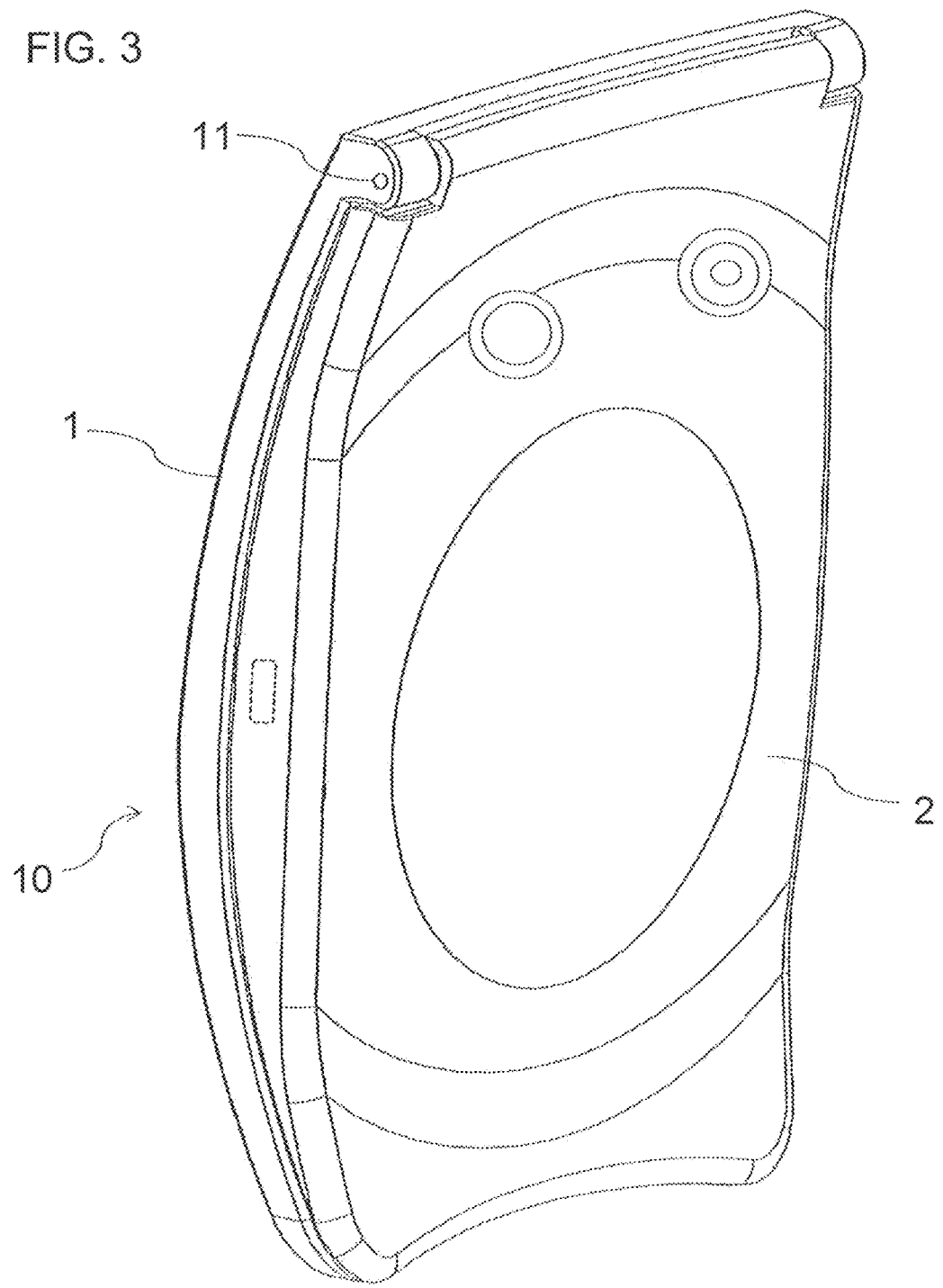
FIG. 3 is a diagrammatic rear perspective view of the mobile communication device of FIG. 2 in the closed configuration.

FIGS. 2 and 3 show the mobile communication device 10 in a closed configuration, with a view of the exterior of the first member 1. A consumer would typically insert the smart phone/communication device 10 into his/her hip pocket with the hinge 11 facing upward.

The preferred embodiment encloses the significant and fragile components within a rugged clamshell case that is designed to absorb the shock of an inadvertent fall without "spiderweb" damage to the display that commonly occurs with the display screens of currently available smartphones and/or damage to the internal electronic components. If desired, the hinges 11 and/or edges of the communication device may be covered and/or padded to assist with absorbing shock in the event that the communication device 10 is inadvertently or accidentally dropped. Scratches to the screens are also avoided by placing the display screens on the internal surfaces of the clam shell design, while shattering is avoided by providing shock absorbing edge surfaces and a rugged case which absorbs impact damage when dropping the phone.

In the past, users have employed plastic screen protectors or tempered glass screen protectors. However, this is essentially placing another layer of glass on top of a consumer's screen, which is already protected with a glass layer on top of it. For obvious reasons then, tempered glass screen protectors are not perfect and have their flaws. One of the biggest issues with these is their thickness. While plastic protectors are usually around 0.1 mm, glass ones typically range between 0.3 and 0.5 mm. In other words, users often notice that there is a glass protector on their device, both due to the feel and the weight. While 0.5 mm might seem like a small number, users can definitely feel a difference when using on screen buttons like the iPhone's Home button. Consumers have responded to the fragility of today's smartphones by purchasing protective boxes or adding glass or plastic screen protectors. All of these solutions increase the overall size and weight of the devices, and they tend to interfere with their functionality by reducing the sensitivity of the touchscreen and the camera sensor. Simply stated, the present invention avoids these problems of the prior art without adding additional components.

Although enabled by blue tooth capability, the present invention also provides for increased distance use without these additional bluetooth components. Particularly, in the preferred embodiment, the user can speak into the communication device, when in the closed configuration, via a second microphone 13 provided at the end of the communication device adjacent the hinge 11. In addition, one or more speakers 14 may be formed in a side wall or end wall of the communication device 10 so it could be used in a speaker phone mode while being carried in a breast pocket.

Another illustrated aspect of the present invention is the clamshell design—similar to the flip phones that were popular before smartphones were introduced. However, the communication device of FIG. 1 is designed to be significantly larger than the prior art. The increased/greater width, length, and thickness of the communication device 10 allow for more display area, a full QWERTY keyboard 5, and other advantages over the prior art which are discussed below in further detail with reference to FIGS. 4-6.

Figure 4:
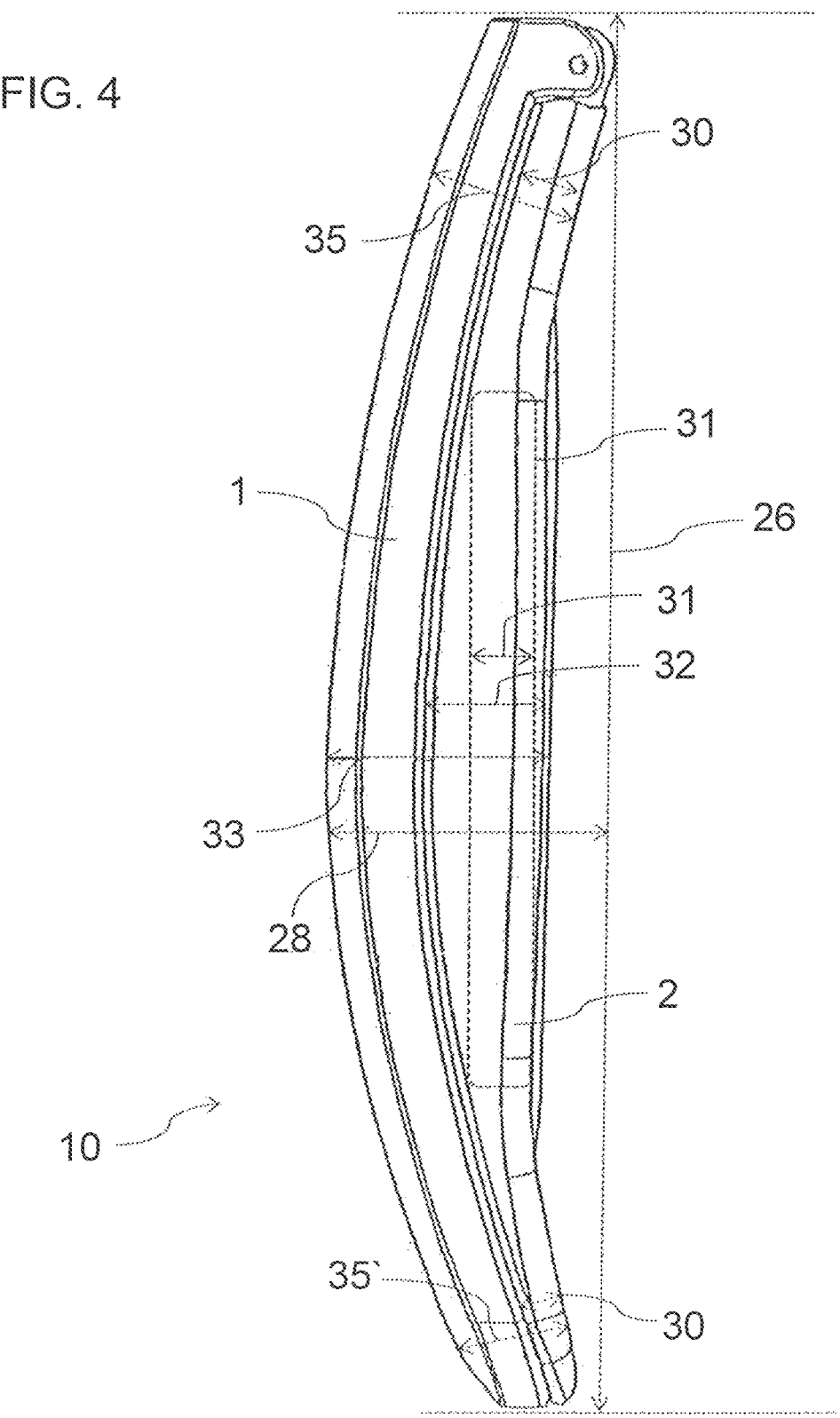
FIG. 4 is a diagrammatic side elevational view of the mobile communication device of FIG. 2 in the closed configuration.

FIG. 4 is a side elevational view, showing the longitudinal curvature of the exterior of the first member 1 and the complex longitudinal curvature of the exterior face of the second member 2 along a longitudinal axis A of the mobile communication device 10. The present invention boasts an additional size which is made possible by the average curvature of the communication device—described below in further detail—which allows it to be comfortably inserted in a pocket, e.g., typically the hip pocket, of an owner. This curvature also allows the average thickness of the device to be much greater than that according to the prior art. An extended intermediate (maximum) thickness 28 of the device when measured from a support surface, e.g., a table for example, to an uppermost point of the device when sitting flat results in a extended thickness 28 of between about $10/16$ of an inch to about $1\frac{1}{2}$ inches and more preferably is about $15/16$ inches thick.

According to this embodiment, in order to facilitate ease and comfort of the user and provide greater features, both of the device end thicknesses 30, 30' of second member 2 are less than a central thickness 32' and maximum thickness 32' of the second member 2. This central thickness 32, generally being, for at least a middle third of the device, greater than 9% of the device folded length 26 and preferably greater than 12% of the device folded length 26. The maximum thickness 32' of the device being in a range of 9% to 30% of the device folded length 26. Contrary to this, the entire device end thicknesses 35, 35' of the device are less than 10% of the device folded length 26 and are preferably 6% of the device folded length 26. Or otherwise stated, the end thicknesses 35, 35' of the device are related to the maximum thickness 32' of the device by a ratio less than 1:1, generally in a range of 1:7 to 2:3 and more preferably a ratio of less than 1:2. This enables the entire device 10 to have a much greater displaced thickness 33 of the mobile communication device 10 than entire end thicknesses 35, 35' of the device. This displaced thickness 33, generally being, for at least a middle third of the device, greater than 19% of the device folded length 26. Thus device end total thicknesses 30, 30' are in a range of 7-15% of the folded length 26, and are preferably less than half of the displaced thickness 33 of the device. It is anticipated according further embodiments shown in FIGS. 7A-7J that a central thickness 32, 32' for both the first and the second members 1, 2 or for one of the first and second members 1, 2 may be greater. Regardless, a central thickness 33 of the device is greater than at least one of the device end thicknesses 30, 30'.

The greater central thickness 32 of the second member 2 facilitates increasing a size of a battery compartment 31, an antenna space, and an interior volume for accommodating device hardware within the second member 2. This, in turn, enables the mobile communication device 10 to have longer lasting batteries, greater service reception, and other additional improved capabilities while still facilitating ease and comfort of a user while carrying the device comfortably in a back pocket. Preferably, the battery compartment 31 may contain a battery with a thickness 31' in a range of from 2 mm to 4 mm, for example, and 3.2 mm as diagrammatically shown in FIG. 4.

Figure 5:
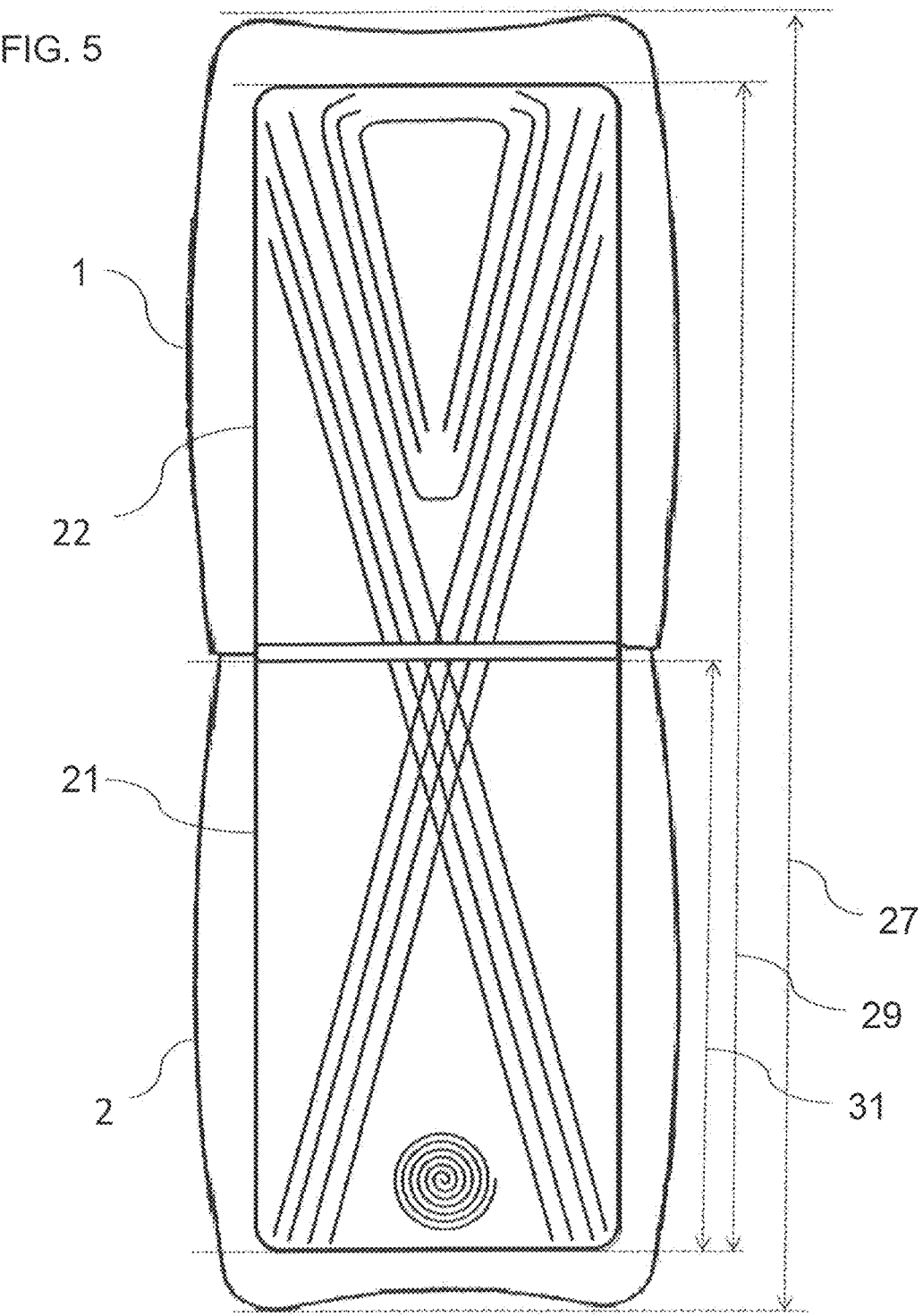
FIG. 5 is a diagrammatic view showing one possible arrangement for a 700 MHz-band antennae according to the present invention.

As mentioned, due to the clamshell nature of the present invention, the present invention provides a user with a phone having a greater overall length. However, even when in a closed configuration, as illustrated in FIG. 4, the present invention may have a 'closed configuration' length 26 (i.e., when the mobile communication device 10 is in its closed position shown in FIG. 4) in a range of about 2 inches to about 7 inches, generally in a range of about 4¼ inches to about 5¼ inches long, and preferably a length of 4⅞ inches. This provides the user with an 'open configuration' length 27, when in the open configuration as shown in FIG. 5, of more than 9½ inches. At least one benefit of this greater 'open configuration' length 27 is an increased antenna length 29.

FIG. 5 is a diagrammatic view showing one possible layout for half-wavelength 700 MHz-band antenna, printed on two sheets 21, 22 of material. There is little separation between the two sheets in the (thin) first member 1, but much greater separation in the thicker body of the second member 2.

As previously discussed, lower frequency bands (such as band 17, 704-746 MHZ and band 13, 746-786 MHZ) have longer wavelengths and, therefore, require longer antennas in order to maintain the adequate radiation efficiency. The most commonly used frequency band, for LTE transmission, is in the 700 MHZ band. The antenna elements used for reception in the 700 MHZ band should ideally be 7.4 inches to 8.5 inches long. Current smartphones are generally not long and/or wide enough for adequately accommodating an antennae of this length, and the compact size of such communication devices tend to increase interference from electronic components. The clamshell design according to the present invention, when manipulated into the opened configuration, provides greater length, width, surface area and volume thereby resulting in greatly improved reception for the mobile communication device 10.

As shown in FIG. 5, the 700 MHz-band antenna is partially accommodated by both of the first and the second members 1, 2. When the communication device is in its opened configuration, so that the first and the second members are pivoted away from one another, a so-called 'open length' 29 of an antenna is approximately twice that of a 'closed length' 31 of an antenna, when the communication device is in the closed configuration. The 'closed length' 31 of this antenna generally ranges from about 2 inches to 6 inches, and more preferably within a range of 3.7 to 4.3 inches. Thus, the 'open configuration' length 29 of this antenna generally ranges from about 4 inches to about 14 inches, and more preferably 7.4 to 8.6 inches, and is able to accommodate all current cellular transmission frequencies.

FIG. 5 also illustrates a second hemispherical antenna, held within the second member 2, which has a radius in the range of from about ½ an inch to about 2 inches, and is preferably ¾ of an inch. Another benefit conferred by the present invention is the manner in which interference from the electronics of the communication device 10 will be concentrated mostly within the second member 2. This ensures that the first member 1 will be relatively free of antenna interference in comparison to other smartphones.

Figure 6A:
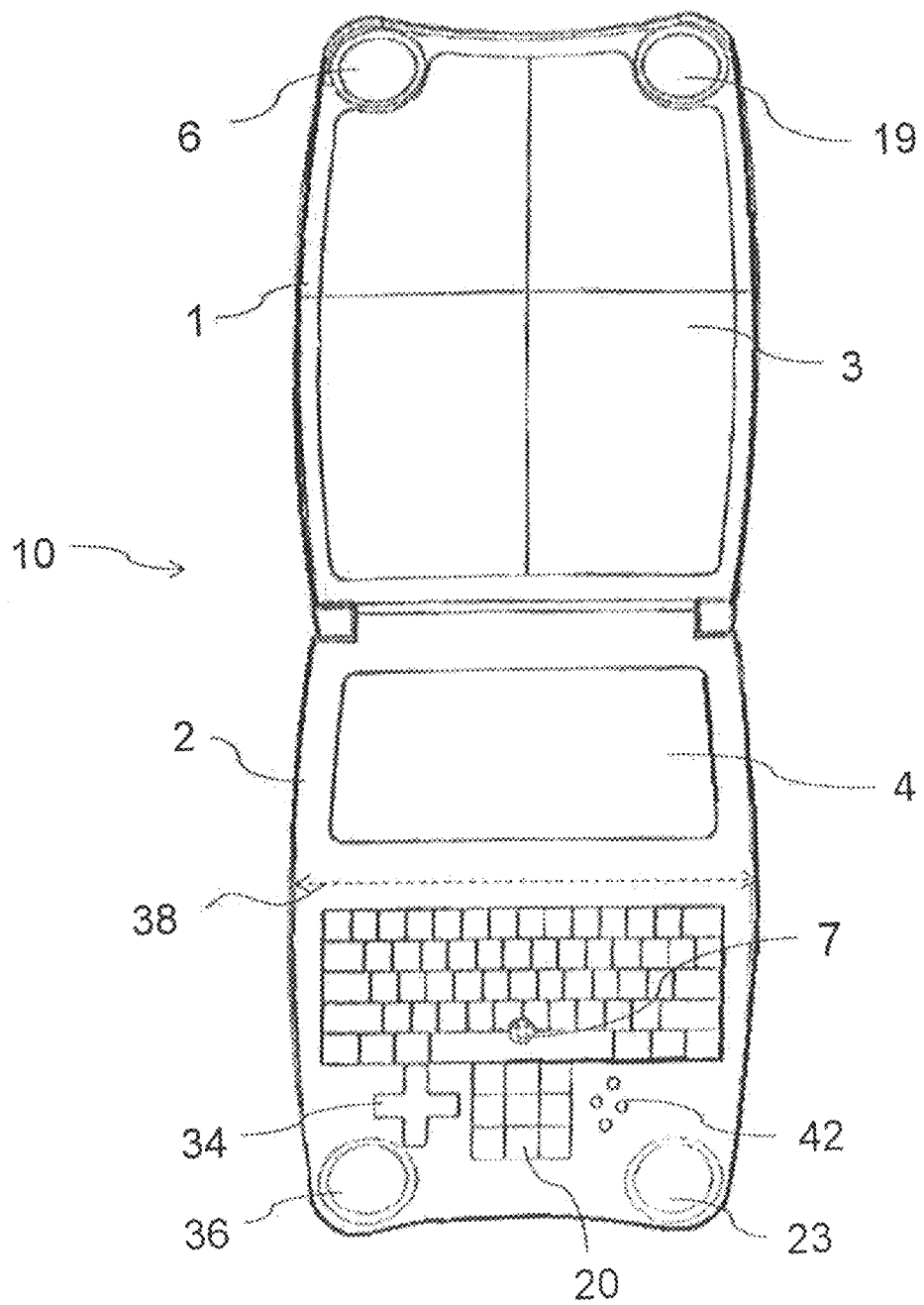
FIG. 6A is a diagrammatic front elevational view of a further embodiment of the present invention, showing the inwardly facing surfaces of the first and the second members.
Figure 6B:
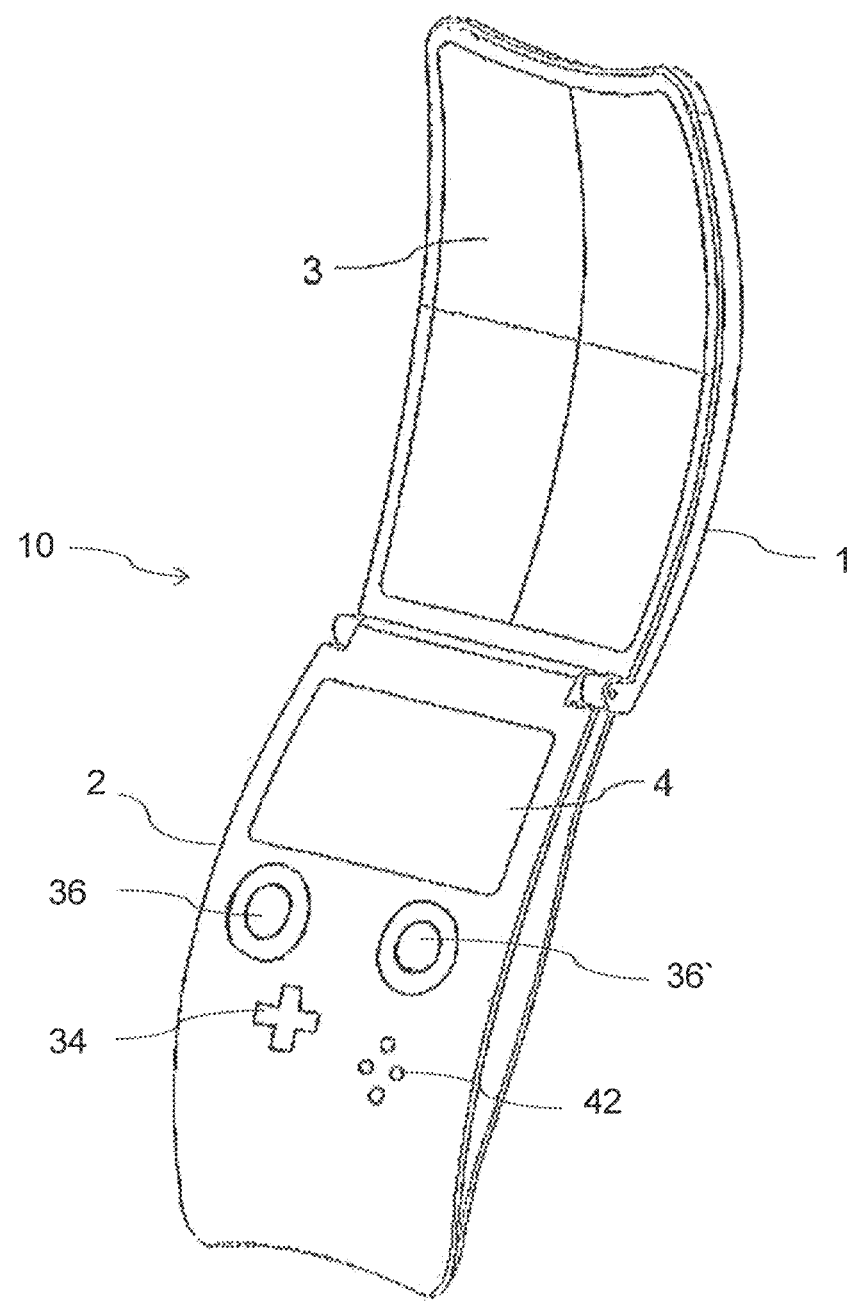
FIG. 6B is a diagrammatic front elevational view showing the inwardly facing surfaces of the first and the second members of another embodiment of the present invention.
Figure 6C:
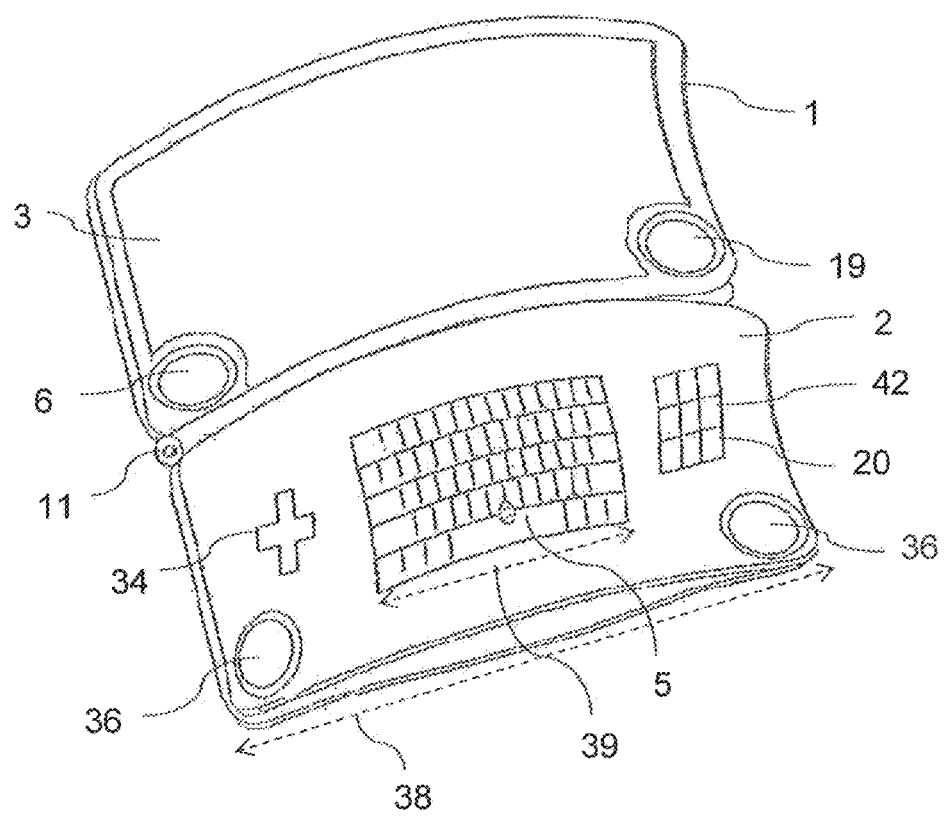
FIG. 6C is a diagrammatic front elevational view showing the inwardly facing surfaces of the first and the second members of a further embodiment of the present invention.

A further embodiment illustrating additional benefits of the greater width of the present invention is illustrated in FIGS. 6A, 6B, and 6C with regard to a particular class of consumers, namely, garners. Generally, FIG. 6A provides further details of the interior faces of the first and the second members 1, 2, showing the keyboard 5 as well as the main microphone 7, a number pad 20, and the depression well 23, which receives the camera housing of the first member 1 when the communication device 10 is in its closed configuration.

According to this embodiment, the greater 3½ inch width 38 (measured from side to side) also allows for a wider keyboard with greater functionality, as well as placement of a D-pad navigation button 34, and a mini joy stick 36. Thus, the present invention allows garners to continue playing their games with full functionality while on the 'go'— without having to carry around more than a single communication device. For other consumers, the navigation button allows for greater ease of navigation of web sites, sending/receiving emails, and/or other consumer content visible on either the first or the second screens 3, 4 of the communication device 10.

Also illustrated in FIG. 6A is the full QWERTY keyboard 5 and numerical pad 20 which also improves functionality of the communication device 10 for business consumers. As defined herein, a full QWERTY keyboard 5 is one including punctuation, symbols, delete and backspace buttons. The full QWERTY keyboard 5 is only possible due to the greater width achieved by the present invention. While the present embodiment illustrates tactile buttons, the present invention provides the width to ensure that regardless of whether the communication device 10 includes an electronic or a tactile keyboard, the user will not have to switch to the next screen in order to input a colon, a semi-colon, an exclamation point, an apostrophe, a question mark or any number. In the embodiment illustrated in FIG. 6A, the width of the device, at its widest point 38, ranges from about 2¼ inches to about 3⅞ inches, and is diagrammatically shown in FIG. 6A as 3½ inches.

FIG. 6B is an alternative arrangement of this gaming embodiment in which a dedicated portable-video-game version of the device, which does not include communication functionality, eliminates the keyboard in favor mini joysticks 36, 36' and buttons 42 which are useful in video gaming. In this illustrated embodiment, by providing a pair of joy sticks 36, 36' on the both the right and left hand sides of the second member 2 of the communication device 10, while providing the D-pad on the left hand side, a garners is easily able to navigate various virtual scenarios with more flexibility than the current models.

FIG. 6C illustrates a slightly modified embodiment in which either a continuous flexible hinge is positioned along one side of the communication device 10 or a pair of spaced apart flexible hinges are positioned adjacent each end of the communication device 10. As discussed above, the greater width 38 allows provision of the full QWERTY keyboard 5 and numerical pad 20 which improves functionality for business consumers. As shown in FIG. 6C, by placing the hinge along the side the communication device 10, this full QWERTY keyboard 5 is one including punctuation, symbols, delete and backspace buttons. Here a length 39 of the full QWERTY keyboard 5, in a range of 3 to 6 inches for example, is only possible due to the greater width of the communication device 10 achieved by the present invention. In the embodiment illustrated in FIG. 6C, the width 38 of the device, at its widest point, typically is in the range from about 3 inches to about 7 inches, and is shown in FIG. 6C as 5¼ inches.

Turning now to FIGS. 7A-7I, various embodiments of the communication device, shown in the folded 'closed configuration,' will now be described. R is to be appreciated that each of FIGS. 7A-7I illustrate various alternative embodiments which have surfaces 40, 43, 45, 47, curvatures C1, C2, C3, C4, average curvatures A1, A2, A3, radiuses of curvatures R1, R2, R4, R5, and average radii of curvatures R3, R6, R7. It is to be appreciated that these embodiments merely represent a number of various implementations which all fall within the spirit and scope of the present invention.

For each of FIGS. 7A-7I, each convex or concave surface may be formed of a series of adjacent planar or curved surfaces, which might be either concave or convex segments within a concave surface; or alternately concave or convex segments within a convex surface. For each, a curvature of a surface is defined by selecting at least three spaced apart points along the surface in question and connecting those three spaced apart points with one another via an arc (i.e., the corresponding curvature) of a virtual circle (see FIGS. 7A-7I), where the radius of curvature for that surface is the radius of the circle through those points. More preferably, for each of these surfaces a radius of curvature is defined by a virtual circle passing through three points in the first end, the second end, and the middle of the surface—equidistant from the ends. Furthermore, this radius of curvature for the surface is considered to be concave or convex even though the surface itself may have either dips or bumps, which are not themselves particularly convex, concave or planar, and otherwise go against the overall concave or convex nature of the surface. Though it is understood that these dips or bumps will never comprise more than 25% of the surface area of the surface in question in order to maintain the otherwise convex or concave nature of the of the surface in question.

Thus, the first member 1 has an outwardly facing first surface 40 which defines a first curvature C1 that has a corresponding first radius of curvature R1. The opposing side of the first member 1 has an inwardly facing second surface 43 which defines a second curvature C2 that has a corresponding second radius of curvature R2. The first curvature C1 and the second curvature C2 combine with one another form a first average curvature A1 for the first member 1. Likewise, the first radius of curvature R1 and the second radius of curvature R2 combine with one another to form a first average radius of curvature R3 for the first member 1.

The second member 2 has an inwardly facing third surface 45 which defines a third curvature C3 that has a corresponding third radius of curvature R4. The opposing side of the second member 2, has an outwardly facing fourth surface 47 which defines a fourth curvature C4 that has a corresponding fourth radius of curvature R5. The third curvature C3 and the fourth curvature C4 combine with one another to form a second average curvature A2 for the second member 2. Likewise, the third radius of curvature R4 and the fourth radius of curvature R5 combine with one another to form a second average radius of curvature R6 for the second member 2.

In addition, the first average curvature A1, for the first member 1, and the second average curvature A2, for the second member 2, combine with one another to form a device average curvature A3 for the communication device 10. Likewise, the first average radius of curvature R3 and the second average radius of curvature R6, for the first and second members 1, 2, combine with one another to form a device average radius of curvature R7 for the communication device 10.

Turning now to FIG. 7A, as generally shown therein, the first member 1 has a generally curved outwardly facing first surface 40 and a generally curved second surface 43, while the second member 2 has a generally curved third surface 45 and a generally planar outwardly facing fourth surface 47. The first, the second and the third surfaces 40, 43, 45, respectively, have first, second, and third curvatures C1 C2, C3 with corresponding radiuses of curvatures R1, R2, R4 which typically range between 2 inches and 8 feet, and more preferably range between about 4.5 inches and about 24 inches or so. The first average curvature A1 of the first member 1 has a first average radius of curvature R3 for the first member 1 which typically ranges between 3.5 inches and 8 feet, and more preferably range between about 6 inches and about 14 inches or so; the second average curvature A2 for the second member 2 has a second average radius of curvature R6 for the second member 2 which typically ranges between 3.5 inches and 8 feet, and more preferably range between about 4.5 inches and about 14 inches or so; and device average curvature A3 has a device average radius of curvature R7 which typically ranges between 3.5 inches and 8 feet, and more preferably range between about 4.5 inches and about 14 inches or so. The fourth surface 47 has a curvature C4 of approximately zero and thus a corresponding radius of curvature R5 which is approaching infinity.

Turning now to FIG. 7B, the first member 1 has a generally curved outwardly facing first surface 40 while the second member 2 has a generally planar outwardly facing fourth surface 47. The first surface 40 has a first curvature C1 with a corresponding radius of curvature R1 which typically ranges between 3.5 inches and 8 feet, and more preferably ranges between about 4.5 inches and about 14 inches or so. Like the fourth surface 47, the second and third surfaces 43, 45 have curvatures C2, C3 approaching zero, e.g., both of those surfaces are substantially planar. Accordingly, the corresponding radiuses of curvatures R2, R4, R5, for the second, the third and the fourth surfaces 43, 45, 47, are each approaching infinity.

The resulting average curvature R6, for the second member 2, is approximately zero and has a corresponding second average radius of curvature R6 which approaches infinity. According this embodiment, only the outwardly facing first surface 40 of the first member 1 is curved with a first curvature C1. As such, the first radius of curvature R1 is the only radius of curvature that does not approach infinity but instead is approximately between 3.5 inches and 8 feet, and more preferably ranges between about 4.5 inches and about 14 inches or so. The resulting first average curvature A1 for the first member 1 has a corresponding first average radius of curvature R3 of between 3.5 inches and 8 feet, and more preferably range between about 4.5 inches and about 14 inches or so. Finally, the communication device has an average curvature A3 with a corresponding average radius of curvature R7 which ranges between 3.5 inches and 8 feet, and more preferably ranges between about 4.5 inches and about 14 inches or so.

Turning now to FIG. 7C, as generally shown therein, the first member 1 has a generally curved outwardly facing first surface 40 while the second member 2 has a generally curved outwardly facing fourth surface 47. The first and the fourth surfaces 40, 47 respectively have first and fourth curvatures C1, C4 with corresponding radiuses of curvatures R1, R5 which each typically range between 3.5 inches and 8 feet, and more preferably range between about 4.5 inches and about 14 inches or so. The second and the third surfaces 43, 45 each have curvatures C2, C3 approaching zero, e.g., both of those surfaces are substantially planar. Accordingly, the corresponding radiuses of curvatures R2, R4, for the second and the third surfaces 43, 45, are each approaching infinity.

The first average curvature A1 of the first member 1 has a first average radius of curvature R3 for the first member 1 which typically ranges between 3.5 inches and 8 feet, and more preferably range between about 4.5 inches and about 14 inches or so; the second average curvature A2 for the second member 2 has a second average radius of curvature R6 for the second member 2 which typically ranges between 3.5 inches and 8 feet, and more preferably range between about 4.5 inches and about 14 inches or so; and the device average curvature A3 has a device average radius of curvature R7 which typically range between 3.5 inches and 8 feet, and more preferably range between about 4.5 inches and about 14 inches or so.

Turning now to FIG. 7D, as generally shown therein, the first member 1 has a generally curved outwardly facing first surface 40 while the second member 2 has a generally curved, concave, outwardly facing fourth surface 47 which comprises a plurality of sequentially arranged planar segments. The first and the fourth surfaces 40, 47 respectively have first and fourth curvatures C1, C4 with corresponding radiuses of curvatures R1, R5 which each typically range between 3.5 inches and 8 feet, and more preferably range between about 4.5 inches and about 14 inches or so. The second and the third surfaces 43, 45 each have curvatures C2, C3 approaching zero, e.g., both of those surfaces are substantially planar. Accordingly, the corresponding radiuses of curvatures R2, R4, for the second and the third surfaces 43, 45, are each approaching infinity.

The first average curvature A1 of the first member 1 has a first average radius of curvature R3 for the first member 1 which typically ranges between 3.5 inches and 8 feet, and more preferably ranges between about 4.5 inches and about 14 inches or so; the second average curvature A2 for the second member 2 has a second average radius of curvature R6 for the second member 2 which typically ranges between 3.5 inches and 8 feet, and more preferably ranges between about 4.5 inches and about 14 inches or so; and the device average curvature A3 has a device average radius of curvature R7 which typically ranges between 3.5 inches and 8 feet, and more preferably ranges between about 4.5 inches and about 14 inches or so.

Figure 7E:
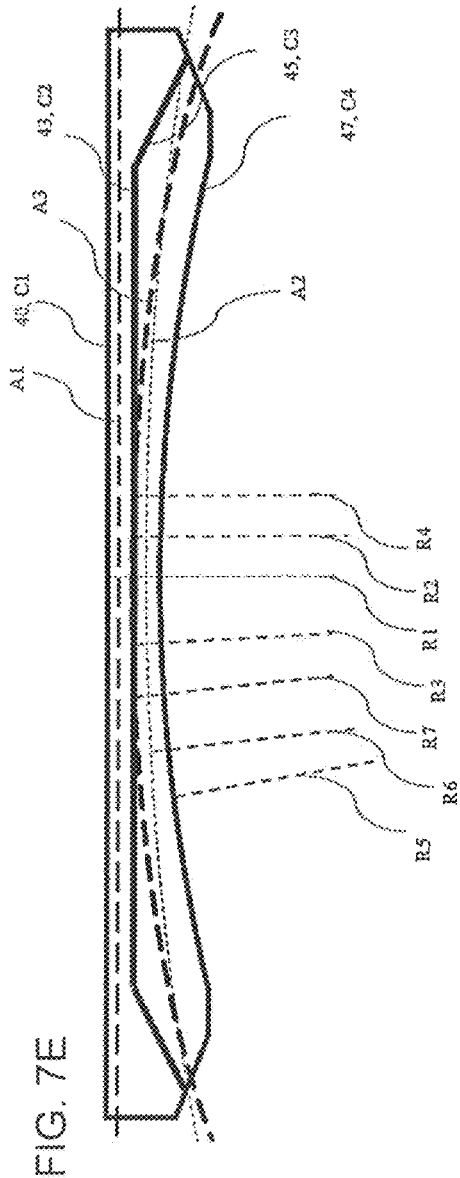

Turning now to FIG. 7E, as generally shown therein, the first member 1 has a generally planar outwardly facing first surface 40 and a generally planar second surface 43, while the second member 2 has a generally planar third surface 45 and a generally curved outwardly facing fourth surface 47. That is, the first, the second and the third surfaces 40, 43, 45 have corresponding first, second and third curvatures C1, C2, C3 which each approach zero, e.g., each of those surfaces are substantially planar. Accordingly, the corresponding radiuses of curvatures R1, R2, R4, for the first, the second and the third surfaces 40, 43, 45, respectively, are each approaching infinity. The fourth surface 47 has a corresponding fourth curvature C4 with a radius of curvature R5 which typically ranges between 3.5 inches and 8 feet, and more preferably ranges between about 4.5 inches and about 14 inches or so.

The first average curvature A1 of the first member 1 has a first average radius of curvature R3 for the first member 1 which typically is approaching infinity; the second average curvature A2 for the second member 2 has a second average radius of curvature R6 which typically ranges between 3.5 inches and 8 feet, and more preferably range between about 4.5 inches and about 14 inches or so; and the device average curvature A3 has a device average radius of curvature R7 which typically ranges between 3.5 inches and 8 feet, and more preferably ranges between about 4.5 inches and about 14 inches or so.

Figure 7F:
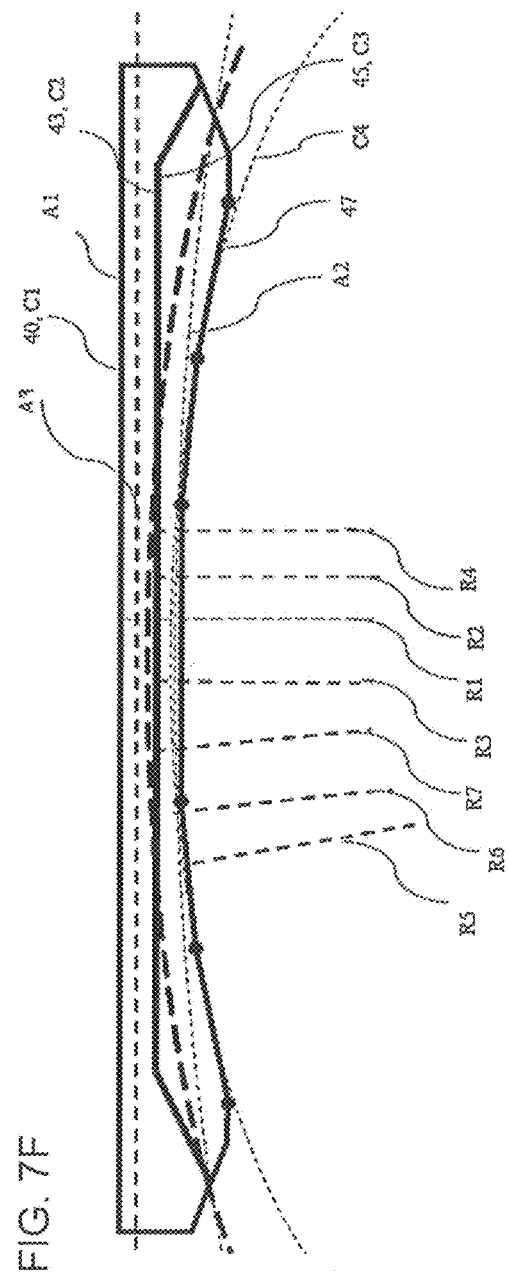

Turning now to FIG. 7F, as generally shown therein, the first member 1 has a generally planar outwardly facing first surface 40 and a generally planar second surface 43, while the second member 2 has a generally planar third surface 45 and a generally curved, concave, outwardly facing fourth surface 47. As shown, the outwardly facing fourth surface 47 is formed of a series of sequentially interconnected generally planar surfaces which together comprise and form the generally curved outwardly facing fourth surface 47. The first, the second and the third surfaces 40, 43, 45 have corresponding first, second and third curvatures C1 C2, C3 which each approach zero, e.g., each of those surfaces are substantially planar. Accordingly, the corresponding radiuses of curvatures R1, R2, R4, for the first, the second and the third surfaces 40, 43, 45, respectively, are each approaching infinity. The fourth surface 47 has a fourth curvature C4 with a radius of curvature R5 which typically ranges between 3.5 inches and 8 feet, and more preferably ranges between about 4.5 inches and about 14 inches or so.

The first average curvature A1 of the first member 1 has a first average radius of curvature R3 for the first member 1 which typically is approaching infinity; the second average curvature A2 for the second member 2 has a second average radius of curvature R6 for the second member 2 which typically ranges between 3.5 inches and 8 feet, and more preferably ranges between about 4.5 inches and about 14 inches or so; and device average curvature A3 has a device average radius of curvature R7 which typically ranges between 3.5 inches and 8 feet, and more preferably range between about 4.5 inches and about 14 inches or so.

Turning now to FIG. 7G, as generally shown therein, the first member 1 has a generally curved outwardly facing first surface 40 and a generally planar second surface 43, while the second member 2 has a generally planar third surface 45 and a generally curved outwardly facing fourth surface 47. As shown, the outwardly facing first surface 40 is formed of a series of sequentially interconnected generally planar surfaces which together comprise and form the generally curved outwardly facing first surface 40. That is, the second and the third surfaces 43, 45 have second and third curvatures C2, C3 approaching zero, e.g., both of those surfaces are substantially planar. Accordingly, the corresponding radiuses of curvatures R2, R4, for the second and the third surfaces 43, 45, respectively, are each approaching infinity. The first and the fourth surfaces 40, 47, respectively, have first and fourth curvatures C1, C4 with radiuses of curvature R1, R5 which each typically range between 3.5 inches and 8 feet, and more preferably range between about 4.5 inches and about 14 inches or so.

The first average curvature A1 of the first member 1 has a first average radius of curvature R3 for the first member 1 which typically ranges between 3.5 inches and 8 feet, and more preferably ranges between about 4.5 inches and about 14 inches or so; the second average curvature A2 for the second member 2 has a second average radius of curvature R6 for the second member 2 which typically ranges between 3.5 inches and 8 feet, and more preferably ranges between about 4.5 inches and about 14 inches or so; and the device average curvature A3 has a device average radius of curvature R7 which typically ranges between 3.5 inches and 8 feet, and more preferably ranges between about 4.5 inches and about 14 inches or so.

Turning now to FIG. 7H, as generally shown therein, the first member 1 has a generally curved outwardly facing first surface 40 and a generally planar second surface 43, while the second member 2 has a generally planar third surface 45 and a generally planar outwardly facing fourth surface 47. As shown, the outwardly facing first surface 40 is formed of a series of sequentially interconnected generally planar surfaces which together comprise and form the generally curved outwardly facing first surface 40. Therefore, the first curvature C1 of the outwardly facing first surface 40 of the first member 1 is the only curvature, in this embodiment, which is greater than zero. Likewise, the first radius of curvature R1 is the only radius of curvature that does not approach infinity but instead, is approximately between 3.5 inches and 8 feet, and more preferably ranges between about 4.5 inches and about 14 inches or so.

The second, the third and the fourth surfaces 43, 45, 47, respectively, have second, third and fourth curvatures C2, C3, C4 approaching zero, e.g., each of those surfaces are substantially planar. Accordingly, the corresponding radiuses of curvatures R2, R4, R5 for the second, the third and the fourth surfaces 43, 45, 47, respectively, are each approaching infinity. The first surface 40 has a first curvature C1 with radius of curvature R1 which typically ranges between 3.5 inches and 8 feet, and more preferably ranges between about 4.5 inches and about 14 inches or so.

The first average curvature A1 of the first member 1 has a first average radius of curvature R3 which typically ranges between 3.5 inches and 8 feet, and more preferably ranges between about 4.5 inches and about 14 inches or so; the second average curvature A2 for the second member 2 has a second average radius of curvature R6 which is approaching infinity; and the device average curvature A3 has a device average radius of curvature R7 which typically ranges between 3.5 inches and 8 feet, and more preferably ranges between about 4.5 inches and about 14 inches or so.

Turning now to FIG. 7I, as generally shown therein, the first member 1 has a generally curved outwardly facing first surface 40 and a generally planar second surface 43, while the second member 2 has a generally planar third surface 45 and a generally planar outwardly facing fourth surface 47. As shown, the outwardly facing first surface 40 is formed of a series of sequentially interconnected generally planar surfaces which together comprise and form the generally curved outwardly facing first surface 40 and the outwardly facing fourth surface 47 is also formed of a series of sequentially interconnected generally planar surfaces which together comprise and form the generally curved outwardly facing fourth surface 47. Therefore, the first curvature C1 of the outwardly facing first surface 40 of the first member 1 and the fourth curvature C4 of the inwardly facing fourth surface 47 of the second member 2 are the only curved surfaces, in this embodiment, that have curvatures greater than zero. Likewise, both the first and the fourth radiuses of curvature R1, R5 are the only radiuses of curvature that do not approach infinity but instead, are each between 3.5 inches and 8 feet, and more preferably range between about 4.5 inches and about 14 inches or so.

The second and the third surfaces 43, 45, respectively, have second and third curvatures C2, C3 which each approach zero, e.g., each of those surfaces are substantially planar. Accordingly, the corresponding radiuses of curvatures R2, R4, for the second and the third surfaces 43, 45, respectively, are each approaching infinity.

The first average curvature A1 of the first member 1 has a first average radius of curvature R3 for the first member 1 which typically ranges between 3.5 inches and 8 feet, and more preferably ranges between about 4.5 inches and about 14 inches or so; the second average curvature A2 for the second member 2 has a second average radius of curvature R6 which typically ranges between 3.5 inches and 8 feet, and more preferably ranges between about 4.5 inches and about 14 inches or so; and the device average curvature A3 has a device average radius of curvature R7 which typically ranges between 3.5 inches and 8 feet, and more preferably ranges between about 4.5 inches and about 14 inches or so.

Turning now to FIG. 7J, as generally shown therein, the first member 1 has a generally convex curved outwardly facing first surface 40 while the second member 2 has a generally concave curved outwardly facing fourth surface 47. The first and the fourth surfaces 40, 47, respectively, have first and fourth curvatures C1, C4 with corresponding radiuses of curvatures R1, R5 which each typically range between 3.5 inches and 8 feet, and more preferably range between about 4.5 inches and about 14 inches or so. Both outwardly facing first and fourth surfaces 40, 47 are shown here with one or more irregularities 50.

The second and the third surfaces 43, 45 each have similar curvatures C2, C3 which are substantially planar in a middle portion. As previously mentioned, each of curvatures C2, C3 are defined by selecting at least three spaced apart points P1, P2, P3 along the surfaces 43, 45 and connecting those three spaced apart points with one another via an arc (i.e., the corresponding curvature) of a virtual circle (see the broken dashed arc in FIG. 7J), where the radii of curvature R2, R4 for those surfaces 43, 45 are the radii of the virtual circles through those points P1, P2, P3. As illustrated in FIG. 7J, the curvatures C2, C3 are defined by a virtual circle passing through three points P1, P2, P3 at the first end P1, the second end P3, and the middle P3 of the surface-equidistant from the ends P1, P3. Accordingly, the corresponding radiuses of curvature R2, R4, for the second and the third surfaces 43,

45, are each greater than the radii of curvature for either radiuses of curvature R1, R7 for the first and the fourth surfaces 40, 47.

Similarly, the curvatures C1, C4 are defined by an arc of a virtual circle passing through three points P1', P2", P3', P1", P2", P3" along the surfaces 40, 47, respectively. As illustrated here, the arcs for virtual circle each of these surfaces 40, 47 are defined by three points passing through the first end, the second end, and the middle of the surfaces 40, 47, where the first and the second points P1', P3', P1", P3" are equidistant from the end points P2', P2". Thus, for the outwardly facing first surface 40, the radius of curvature for the first surface is considered to be convex even though the (single) irregularity 50 is of a concave nature and otherwise is contrary to the overall convex nature of the first surface 40. Similarly, for the outwardly facing fourth surface 47, the radius of curvature for the fourth surface is considered to be concave even though the two or more irregularities 50 are of a convex, concave and variable nature and otherwise are contrary to the overall concave nature of the fourth surface 47. It is noted, however, that these irregularities 50 comprise less than 25% of the surface area of either the first or fourth surfaces 40, 47 so as to not significantly compromise their respective overall convex or concave general shapes or natures.

Thus, when determining the average curvatures, the first average curvature A1 of the first member 1 has a first average radius of curvature R3 which typically ranges between 3.5 inches and 8 feet, and more preferably range between about 4.5 inches and about 14 inches or so. The second average curvature A2 for the second member 2 has a second average radius of curvature R6 which typically ranges between 3.5 inches and 8 feet, and more preferably range between about 4.5 inches and about 14 inches or so. Finally, the device average curvature A3 has a device average radius of curvature R7 which typically range between 3.5 inches and 8 feet, and more preferably ranges between about 4.5 inches and about 14 inches or so.

Turning now to FIG. 7K, this figure generally shows a diagrammatic side elevational view of an embodiment of the mobile communication device 10, according to the present invention, in a closed configuration. FIG. 7K diagrammatically illustrates the virtual circles V, V' V'", V''', as described above but not fully shown in FIGS. 7A-7J, which are coincident with the curvatures C1, C2, C3, C4 of the first and the second members 1, 2 of the communication device 10.

As shown herein, the first member 1 has a generally convex curved outwardly facing first surface 40 with a curvature C1 which is defined by selecting at least three spaced apart points P1', P2', P3' along the surface 40. An arc (e.g., a portion or a segment) of the virtual circle V' (see the broken dashed arc in FIG. 7K), passes through and connects those selected points P1', P2', P3' with one another. Thus, the radius of curvature R1 for the surface 40 is also the radius of the virtual circle V'. As shown, the curvature C1 of the first surface 40 has a radius of curvature R1 which typically ranges between 2 inches and 8 feet, and more preferably ranges between about 4.5 inches and about 5.5 inches or so.

Similarly, the inwardly facing concavely curved second surface 43 of the first member has a curvature C2 which is defined by selecting at least three spaced apart points P1, P2, P3 along the surface 43. As before, an arc of a virtual circle V (see the dashed arc in FIG. 7K), passes through and connects those selected points P1, P2, P3 with one another. Thus, the radius of the second curvature R2 for the second surface 43 is also the radius of the virtual circle V. As shown, the curvature C2 of the second surface 43 has a radius of curvature R2 which typically ranges between 2.5 inches and 8.5 feet, and more preferably ranges between about 5 inches and about 6 inches or so.

Mirroring the inwardly facing concavely curved second surface 43 of the first member, the convex curved inwardly facing third surface 5 of the second member 2 has a curvature C3, almost identical to the curvature C2. This curvature C3 is also defined by selecting at least three spaced apart points P1, P2, P3 along its respective surface 47. Again, a virtual circle V'" (see the dotted-dashed arc in FIG. 7K) is drawn so that an arc (e.g., a portion, a segment) of the virtual circle V'" passes through and connects those selected points P1'", P2'", P3'" with one another. Thus, the radius of the third curvature R3 for the surface 45 is also the radius of the virtual circle V'". As shown, the curvature C3 of the third surface 45 has a radius of curvature R3 which typically ranges between 2.5 inches and 8.5 feet, and more preferably ranges between about 5 inches and about 6 inches or so.

As shown, the outwardly facing surface 47 of the second member 2 has multiple planar and slightly curved segments and irregularities which together form a curved convex outwardly facing fourth surface 47. This fourth surface 47 has a curvature C4 which is defined by selecting at least three spaced apart points P1", P2", P3" along the surface 47. An arc of a virtual circle V" passes through and connects those selected points P1", P2", P3" with one another. (See FIG. 7K in which the large dashed line illustrates only a portion of the circle V" as size constraints prevent illustration of the virtual circle V" in its entirety.). Thus, the radius of curvature R5 for the fourth surface 47 is also the radius of the virtual circle V". Here the radius of curvature R5 of the fourth surface 47 typically ranges between 4 inches and 8.5 feet, and more preferably ranges between about 8 inches and about 9 inches or so.

Accordingly, when determining the average curvatures (not shown in FIG. 7K), the first average curvature A1 of the first member 1 has a first average radius of curvature R3 for the first member 1 which typically ranges between 3.5 inches and 8 feet, and more preferably range between about 6 inches and about 14 inches or so; the second average curvature A2 for the second member 2 has a second average radius of curvature R6 for the second member 2 which typically ranges between 3.5 inches and 8 feet, and more preferably range between about 4.5 inches and about 14 inches or so; and device average curvature A3 has a device average radius of curvature R7 which typically ranges between 3.5 inches and 8 feet, and more preferably ranges between about 4.5 inches and about 14 inches.

While each of FIGS. 7A-7K were described as having surfaces with curvatures which generally extend parallel to a longitudinal axis of the mobile communication device, it is to be appreciated that the mobile communication device may also have surfaces with curvatures which extend substantially normal to the longitudinal axis of the mobile communication device, e.g., the curvature is from edge to edge of the first and second members 1, 2 rather than from end to end of the first and second members 1, 2. Further, it is to be appreciated that the mobile communication device may also comprise both: (1) surfaces with curvatures which extend parallel to longitudinal axis of the mobile communication device and (2) surfaces with curvatures which extend substantially normal to the longitudinal axis of the mobile communication device.

In the above description and appended drawings, it is to be appreciated that only the terms "consisting of" and "consisting only of" are to be construed in the limitative sense while of all other terms are to be construed as being open-ended and given the broadest possible meaning.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

I claim:

1. A folding electronic gaming or folding mobile communication device comprising a first unfolded opened configuration in which first, second, third and fourth surfaces are all outwardly-facing surfaces:
the first surface having a first curvature,
the second surface having a second curvature;
the third surface having a third curvature; and
the fourth surface having a fourth curvature that is greater than the first curvature, the second curvature, and the third curvature;
the device being movable between the opened configuration and a second folded closed configuration in which the first and fourth surfaces are outwardly-facing, and the second and third surfaces are inwardly-facing surfaces;
a display screen or display screens being provided on at least a portion of both the second and the third inwardly facing cured surfaces; and
when the device is in the closed configuration, an average radius of curvature of the device being 8 feet or less to facilitate carrying of the device in a hip pocket of a user.

2. The folding electronic gaming or folding mobile communication device according to claim 1, wherein at least one antenna is partially accommodated by the device; and when the device is folded into the closed configuration, a length of the device is approximately half of the length of the device in the opened configuration.

3. The folding electronic gaming or folding mobile communication device according to claim 1, wherein the first surface and the second surface comprise a first member and the third surface and the forth surface comprise a second member;
a middle portion of the second member is thicker than both opposed first and second ends of the second member; and
the middle portion of the second member is thicker than a middle portion of the first member to facilitate accommodating a battery which has a thickness of at least 3 mm.

4. The folding electronic gaming or folding mobile communication device according to claim 1, wherein, when the device is in the opened configuration, a length of at least one antenna is at greater than 7 inches.

5. The folding electronic gaming or folding mobile communication device according to claim 3, wherein the third surface and the forth surface comprise a second member;
the third surface is a continuously curved, continuously convex surface, such that the third curvature extends consistently from the first end to the opposite second end of the second member; and
the fourth surface is a series of adjacent concave or planar surfaces that join together at angles, from the first end to the opposite end of the second member, and form a concave surface.

6. The folding electronic gaming or folding mobile communication device according to claim 1, wherein at least one of the first, the second, the third, and the fourth curvatures have a radius of curvature which is in a range from about 4.5 inches to 14 inches.

7. The folding electronic gaming or folding mobile communication device according to claim 1, wherein the first surface and the second surface comprise a first member and the third surface and the forth surface comprise a second member; and
edges of at least one of the first and the second members are flexible and the flexible edges provide a shock absorbing benefit in an event that the device is dropped.

8. A folding electronic gaming or folding mobile communication device comprising:
a first member comprising:
a first surface with a first curvature,
a second surface with a second curvature, and a display screen being provided on the second surface;
a second member comprising:
a third surface with a third curvature, and a display screen being provided on the third surface, and
a fourth surface with a fourth curvature;
the first member being connected to the second member by a hinge which facilitates pivoting movement of the first member with respect to the second member, about the hinge, between an unfolded opened configuration and a folded closed configuration in which the first and fourth surfaces are outwardly-facing, and the second and third surfaces are inwardly-facing; and
when the device is in the closed configuration and if the first, the second, the third, and the fourth curvatures are averaged together, the device having an average radius of curvature of 8 feet or less.

9. The folding electronic gaming or folding mobile communication device according to claim 8, wherein at least one antenna is partially accommodated by both the first and the second members; and
when the device is folded about the hinge into the closed configuration, a length of the device is approximately half of the length of the device in the opened configuration.

10. The folding electronic gaming or folding mobile communication device according to claim 8, wherein a middle portion of the second member is thicker than both opposed first and second ends of the second member; and
the middle portion of the second member is thicker than a middle portion of the first member to facilitate accommodating a battery which has a thickness of at least 3 mm.

11. The folding electronic gaming or folding mobile communication device according to claim 8, wherein, when the device is in the opened configuration, a length of at least one antenna is greater than 7 inches.

12. The folding electronic gaming or folding mobile communication device according to claim 10, wherein the third surface is a continuously curved, continuously convex surface, such that the third curvature extends consistently from the first end to the opposite second end of the second member; and the fourth surface is a series of adjacent concave or planar surfaces that join together at angles, from the first end to the opposite end of the second member, and form a concave surface.

13. The folding electronic gaming or folding mobile communication device according to claim 8, wherein at least one of the first, the second, the third, and the fourth curvatures have a radius of curvature which is in a range from about 4.5 inches to 14 inches.

14. The folding electronic gaming or folding mobile communication device according to claim 8, wherein edges of at least one of the first and the second members are flexible and the flexible edges provide a shock absorbing benefit in an event that the device is dropped.

15. A folding mobile communication or electronic gaming device comprising a first unfolded opened configuration in which first, second, third and fourth surfaces are all outwardly-facing surfaces:
the first surface having a first curvature,
the second surface having a second curvature;
the third surface having a third curvature, and
the fourth surface having a fourth curvature;
the device being movable between the opened configuration and a second folded closed configuration in which the first and fourth surfaces are outwardly-facing, and the second and third surfaces are inwardly-facing surfaces;
a display screen or display screens being provided on at least a portion of the second and the third surfaces; and
when the device is in the closed configuration and if the first, the second, the third, and the fourth curvatures are averaged together, the device having a device average radius of curvature of 14 inches or less; and
a thickness of a middle portion of the device being greater than a thickness adjacent each opposed ends of the device so that the device taper toward each opposed end to facilitate carrying of the device in a hip pocket of a user.

16. The folding electronic gaming or folding mobile communication device according to claim 15, wherein at least one antenna is partially accommodated by the device; and
when the device is folded about the hinge into the closed configuration, a length of the device is approximately half of the length of the device in the opened configuration.

17. The folding electronic gaming or folding mobile communication device according to claim 15, wherein the first surface and the second surface comprise a first member and the third surface and the forth surface comprise a second member;
a middle portion of the second member is thicker than both opposed first and second ends of the second member; and
the middle portion of the second member is thicker than a middle portion of the first member to facilitate accommodating a battery which has a thickness of at least 3 mm.

18. The folding electronic gaming or folding mobile communication device according to claim 15, wherein, when the device is in the opened configuration, a length of at least one antenna is greater than 7 inches.

19. The folding electronic gaming or folding mobile communication device according to claim 15, wherein at least one of the first, the second, the third, and the fourth curvatures have a radius of curvature which is in a range from about 4.5 inches to 14 inches; and
edges of at least one of the first and the second members are flexible and the flexible edges provide a shock absorbing benefit in an event that the device is dropped.

* * * * *